US012143495B2

United States Patent
Tokuyama

(10) Patent No.: US 12,143,495 B2
(45) Date of Patent: Nov. 12, 2024

(54) SYSTEM AND METHOD FOR PROVIDING SERVICE RELATED TO THE USER BASED ON BIOMETRIC AUTHENTICATION OF THE USER

(71) Applicant: Masaaki Tokuyama, Tokyo (JP)

(72) Inventor: Masaaki Tokuyama, Tokyo (JP)

( * ) Notice: Subject to any disclaimer, the term of this patent is extended or adjusted under 35 U.S.C. 154(b) by 0 days.

(21) Appl. No.: 18/041,976

(22) PCT Filed: Nov. 16, 2021

(86) PCT No.: PCT/JP2021/042059
§ 371 (c)(1),
(2) Date: Feb. 23, 2023

(87) PCT Pub. No.: WO2022/259569
PCT Pub. Date: Dec. 15, 2022

(65) Prior Publication Data
US 2023/0396440 A1 Dec. 7, 2023

(30) Foreign Application Priority Data
Jun. 10, 2021 (JP) .................. 2021-097393

(51) Int. Cl.
*H04L 9/32* (2006.01)
*H04L 9/08* (2006.01)

(52) U.S. Cl.
CPC .......... *H04L 9/3231* (2013.01); *H04L 9/0825* (2013.01); *H04L 9/0866* (2013.01)

(58) Field of Classification Search
CPC .... H04L 9/3231; H04L 9/0825; H04L 9/0866
(Continued)

(56) References Cited

U.S. PATENT DOCUMENTS 8,627,095 B2 * 1/2014 Asano ............... G06F 21/32
726/19
8,816,818 B2 * 8/2014 Yamada ............. G06V 40/1365
340/5.82
(Continued)

FOREIGN PATENT DOCUMENTS

JP 2011-155348 A 8/2011
JP 2018-510593 A 4/2018
(Continued)

OTHER PUBLICATIONS

International Search Report and Written Opinion issued in connection with PCT/JP2022/029272 dated Sep. 27, 2022.
(Continued)

*Primary Examiner* — Moeen Khan
(74) *Attorney, Agent, or Firm* — FOLEY & LARDNER LLP

(57) ABSTRACT

An authentication system includes an authentication apparatus to perform user authentication in the background and an information processing device including first pair key generation means for generating a first pair key including a first public key and a first secret key, the information processing device being configured to provide a service. The authentication apparatus generates a biometric key from biometric information of the user when background authentication is successful, generates a second pair key including a second public key and a second secret key, based on the biometric key and random information, acquires the first public key, generates a common key, based on the acquired first public key and the second secret key, and then generates specification information, based on the random information and the common key. The information processing device acquires the generated specification information and pro-
(Continued)

vides a service related to a user specified by the specification information.

6 Claims, 24 Drawing Sheets

(58) Field of Classification Search
USPC .......................................................... 713/186
See application file for complete search history.

(56) References Cited

U.S. PATENT DOCUMENTS

| | | | |
|---|---|---|---|
| 10,434,419 B2* | 10/2019 | Tsuchiya | ................. A63F 13/25 |
| 10,868,672 B1* | 12/2020 | Farrugia | ............... H04L 9/0861 |
| 11,757,662 B2* | 9/2023 | Le Saint | ............... H04L 9/3242 |
| | | | 713/171 |
| 2006/0048212 A1* | 3/2006 | Tsuruoka | ............. H04L 9/0866 |
| | | | 726/4 |
| 2016/0294555 A1 | 10/2016 | Jakobsson et al. | |
| 2017/0078091 A1* | 3/2017 | Fiske | .................... H04L 9/3231 |
| 2018/0137265 A1 | 5/2018 | Tokuyama | |
| 2021/0342433 A1 | 11/2021 | Fujita et al. | |
| 2023/0205857 A1 | 6/2023 | Sato et al. | |

FOREIGN PATENT DOCUMENTS

| | | |
|---|---|---|
| JP | 2020-113107 A | 7/2020 |
| JP | 6869450 B | 5/2021 |
| JP | 6946592 B | 10/2021 |
| WO | WO-2016/175333 A1 | 11/2016 |

OTHER PUBLICATIONS

Shibata, Yoichi. "A challenge-response authentication with a password extracted from a fingerprint", IEICE Technical Report, Jul. 13, 2004, pp. 179-186.

Shibata, Yoichi. "Mechanism-based PKI-A Real-time Key Generation from Fingerprints", IPSJ Journal, Aug. 15, 2004, pp. 1833-1844.

* cited by examiner

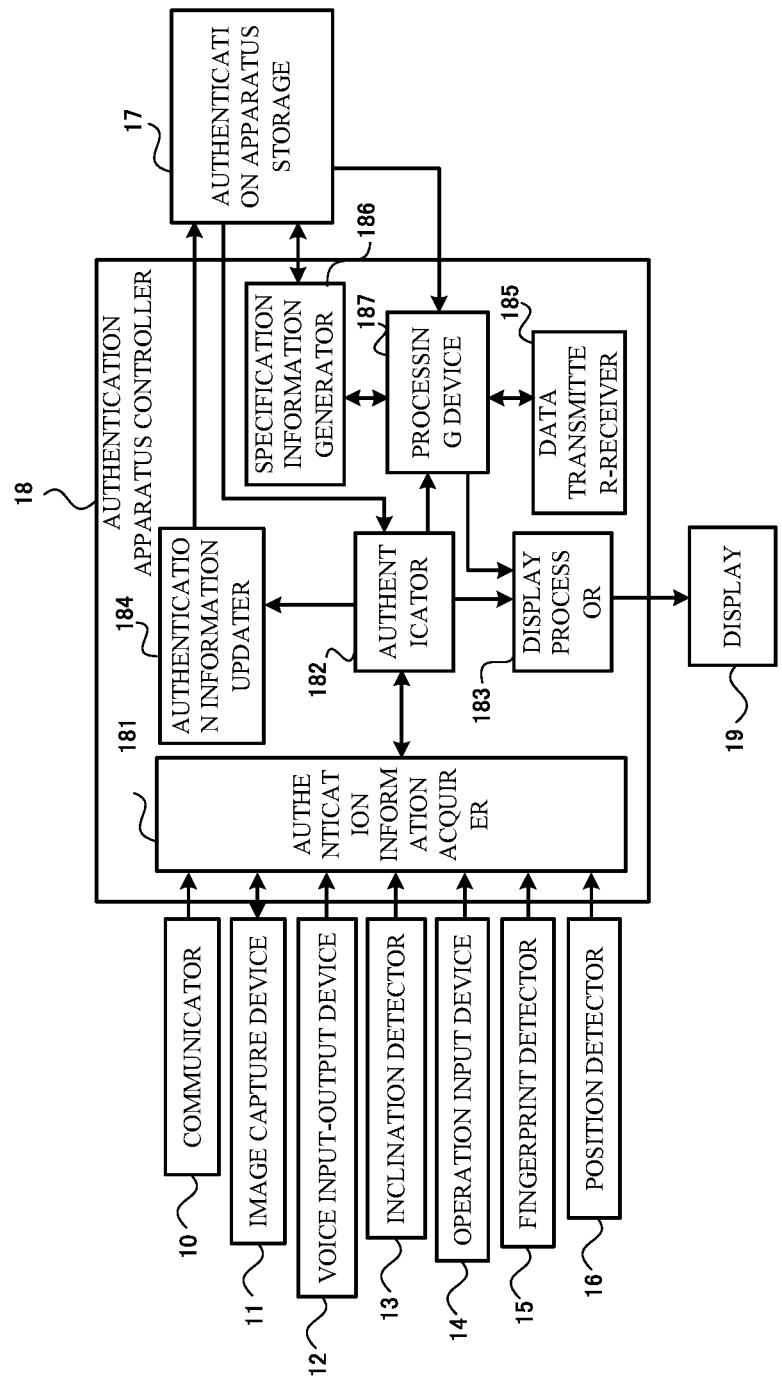

FIG.6A

AUTHENTICATION BIOMETRIC INFORMATION DB 171

| BIOMETRIC INFORMATION TYPE | REGISTERED INFORMATION | MEAN VALUE OF AUTHENTICATION VALUES | ALLOWABLE AUTHENTICATION VALUE | AUTHENTICATION THRESHOLD VALUE |
|---|---|---|---|---|
| FACE | AAA | 0.44 | 0.48 | 0.40 |
| VOICE | ‖‖‖‖‖ | 0.32 | 0.38 | 0.27 |
| IRIS | ●○◎△ | 0.49 | 0.55 | 0.42 |
| FINGERPRINT | ×○×× | 0.39 | 0.41 | 0.30 |
| ... | ... | ... | ... | ... |

FIG.6B

AUTHENTICATION BEHAVIOR INFORMATION DB 172

| BEHAVIOR TYPE | ACQUIRED INFORMATION | LATEST STATUS | ACCEPTANCE CONDITION |
|---|---|---|---|
| COMMUNICATION CONNECTION | ABC_WLAN | 31 TIMES | CONNECTION COUNT EQUAL TO OR GREATER THAN 100 |
| COMMUNICATION CONNECTION | 123WLAN | 157 TIMES | CONNECTION COUNT EQUAL TO OR GREATER THAN 100 |
| EVENT EXECUTION | ○×PARK | 113 m | DISTANCE WITHIN 100 m |
| EVENT EXECUTION | △●MOVIE THEATER | 72 m | DISTANCE WITHIN 100 m |
| DISTANCE BETWEEN FACE AND TERMINAL DEVICE | — | 262 mm | WITHIN DISTANCE PLUS OR MINUS 20 mm |
| DEVICE CONNECTION | DEFGH | BEING CONNECTED | BEING CONNECTED |
| ... | ... | ... | ... |

FIG.6C

INCLINATION INFORMATION TABLE 173

| ANGLE | ACQUISITION DATE AND TIME | STANDBY TIME |
|---|---|---|
| 127 DEGREES | 2019/07/12 11:25:32 | 0.5Sec |

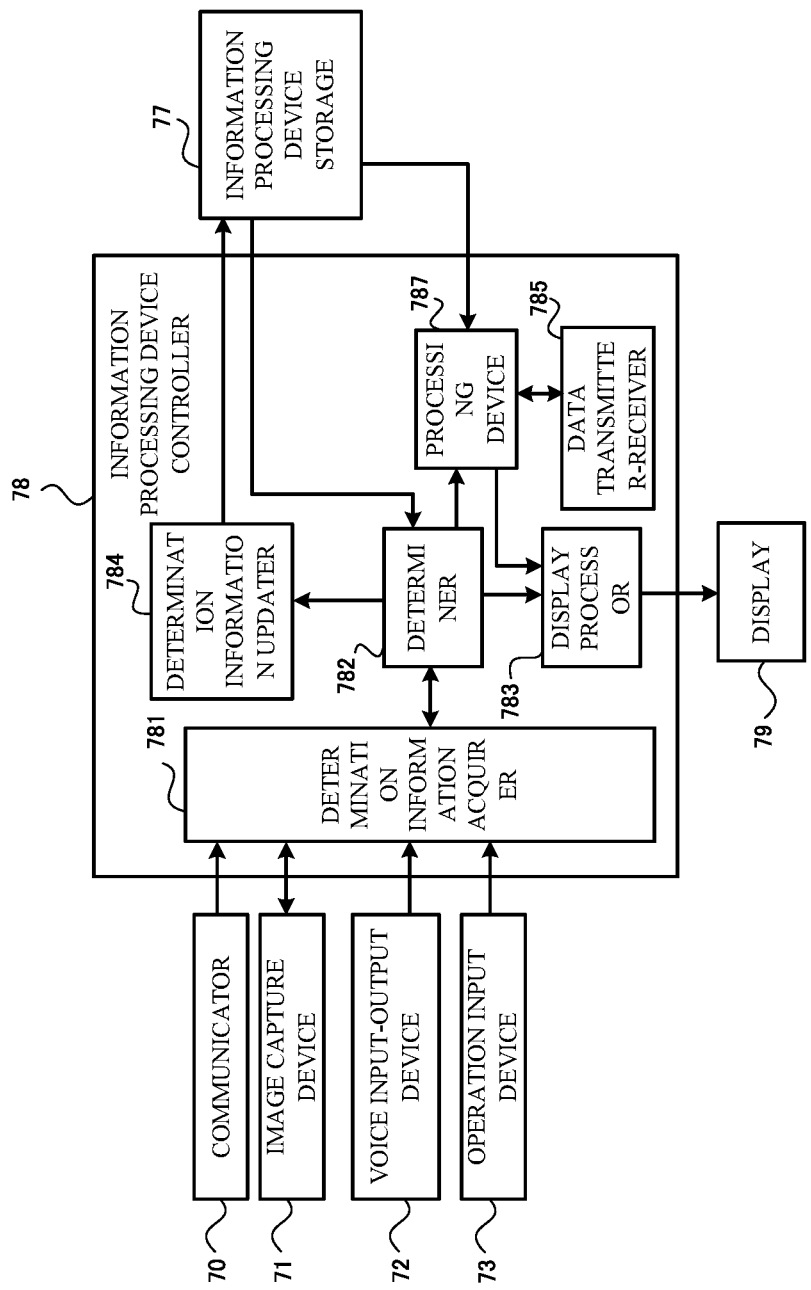

FIG.10A

REFERENCE INFORMATION LIST 771

| SPECIFICATION INFORMATION | TARGET USER | SCENE | DETERMINATION THRESHOLD VALUE | ALLOWABLE DETERMINATION VALUE | ALLOWABLE COUNT |
|---|---|---|---|---|---|
| XXXXXXXX | A | ONLINE CLASS 1 | 3.00 | 3.50 | 5 |
| | | ONLINE CLASS 2 | 3.10 | 3.40 | 4 |
| | | TEST 1 | 2.80 | 3.30 | 2 |
| XXXXXXUZ | B | ONLINE CLASS 1 | 3.15 | 3.66 | 5 |
| | | ONLINE CLASS 2 | 3.13 | 3.41 | 4 |
| | | TEST 1 | 2.85 | 3.32 | 2 |
| ... | ... | ... | ... | ... | ... |

FIG.10B

ACTION INFORMATION 772

| SCENE | TARGET USER | SPECIFIC ACTION | REFERENCE |
|---|---|---|---|
| ONLINE CLASS | A | WAKE UP | HEIGHT OF LINE OF SIGHT BEING LESS THAN 20 cm CONTINUES FOR 1 MINUTE OR LONGER |
| | | DON'T SLEEP | HEIGHT OF LINE OF SIGHT BEING LESS THAN 20 cm CONTINUES FOR 10 SECONDS TO 1 MINUTE |
| ... | ... | ... | ... |

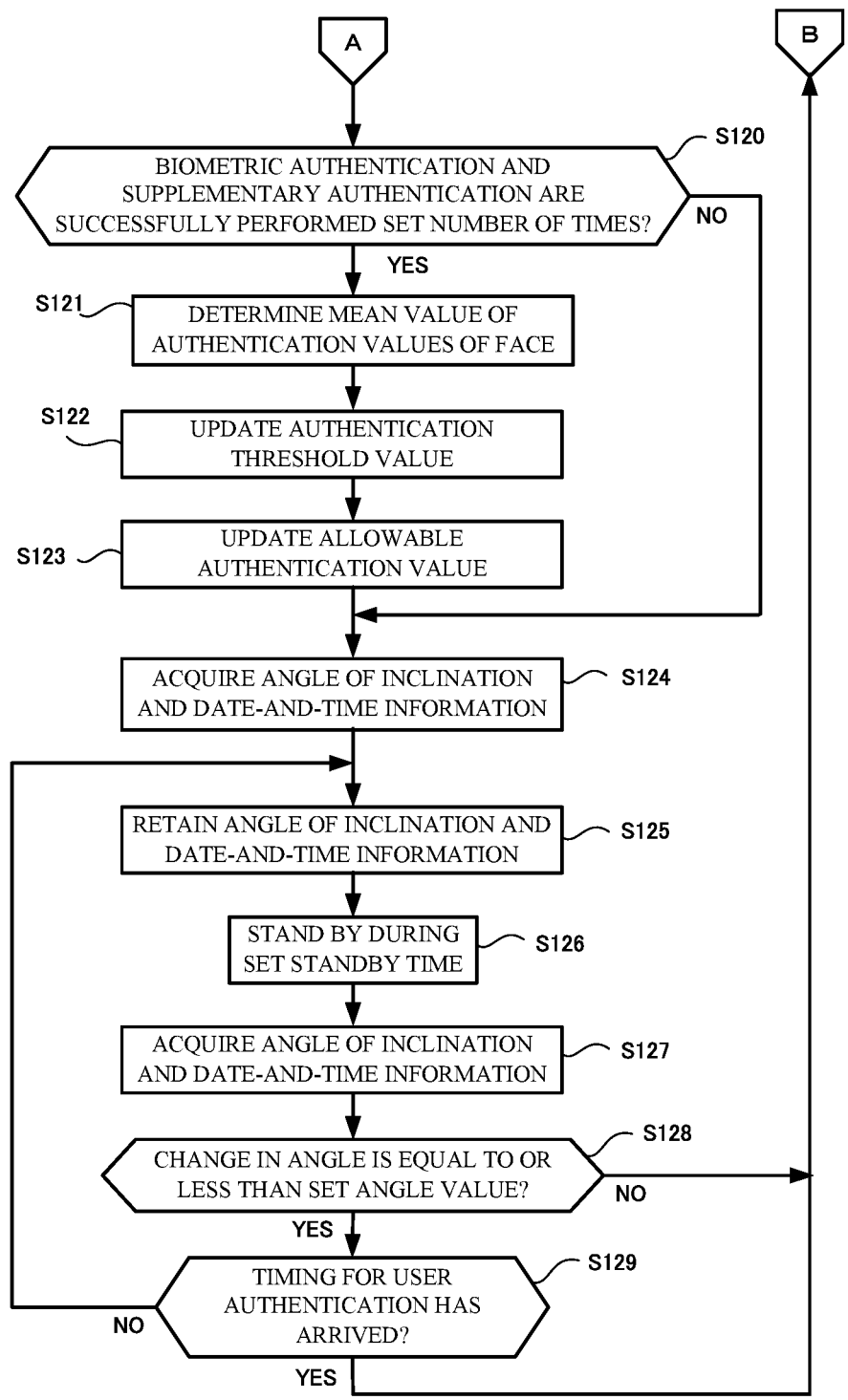

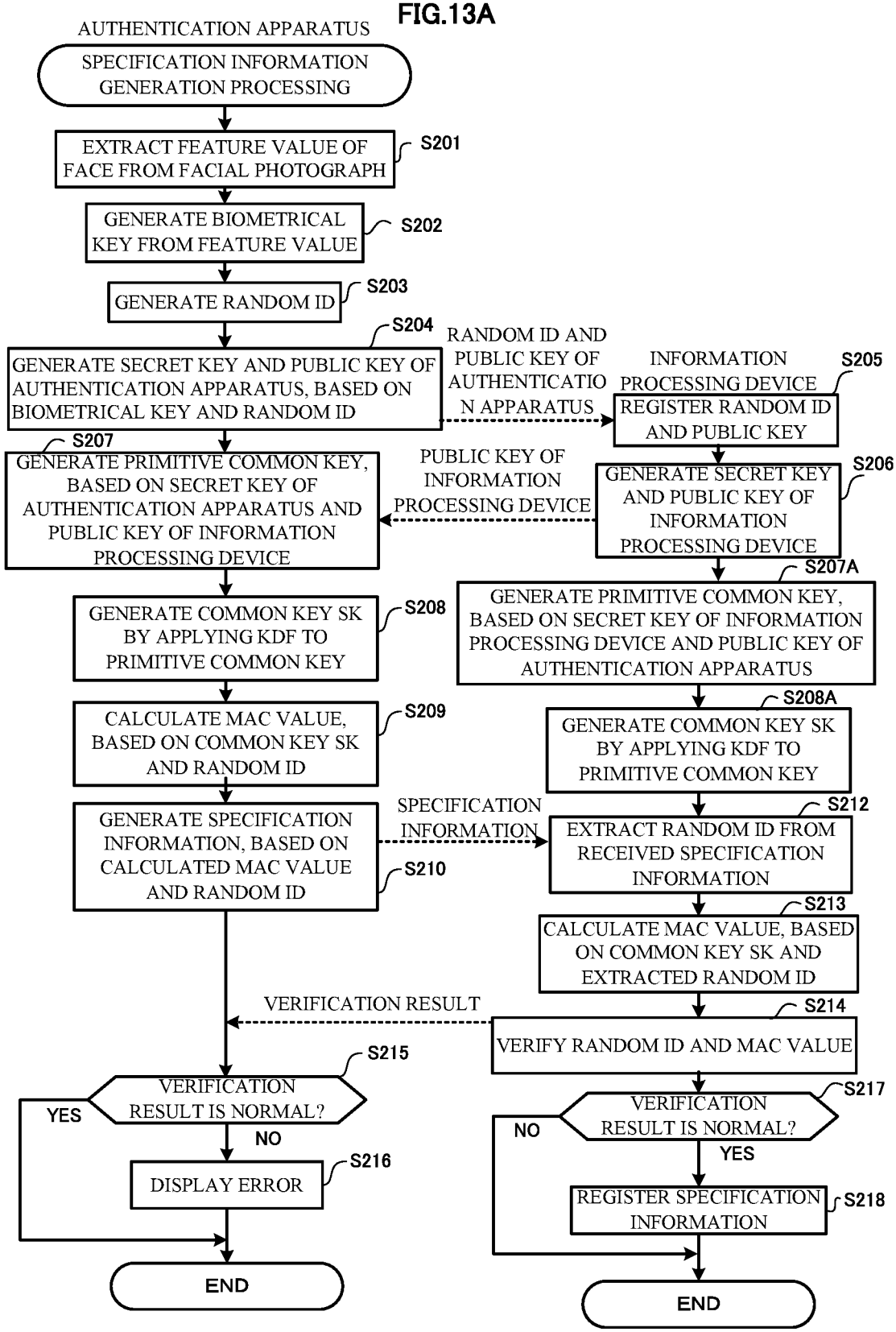

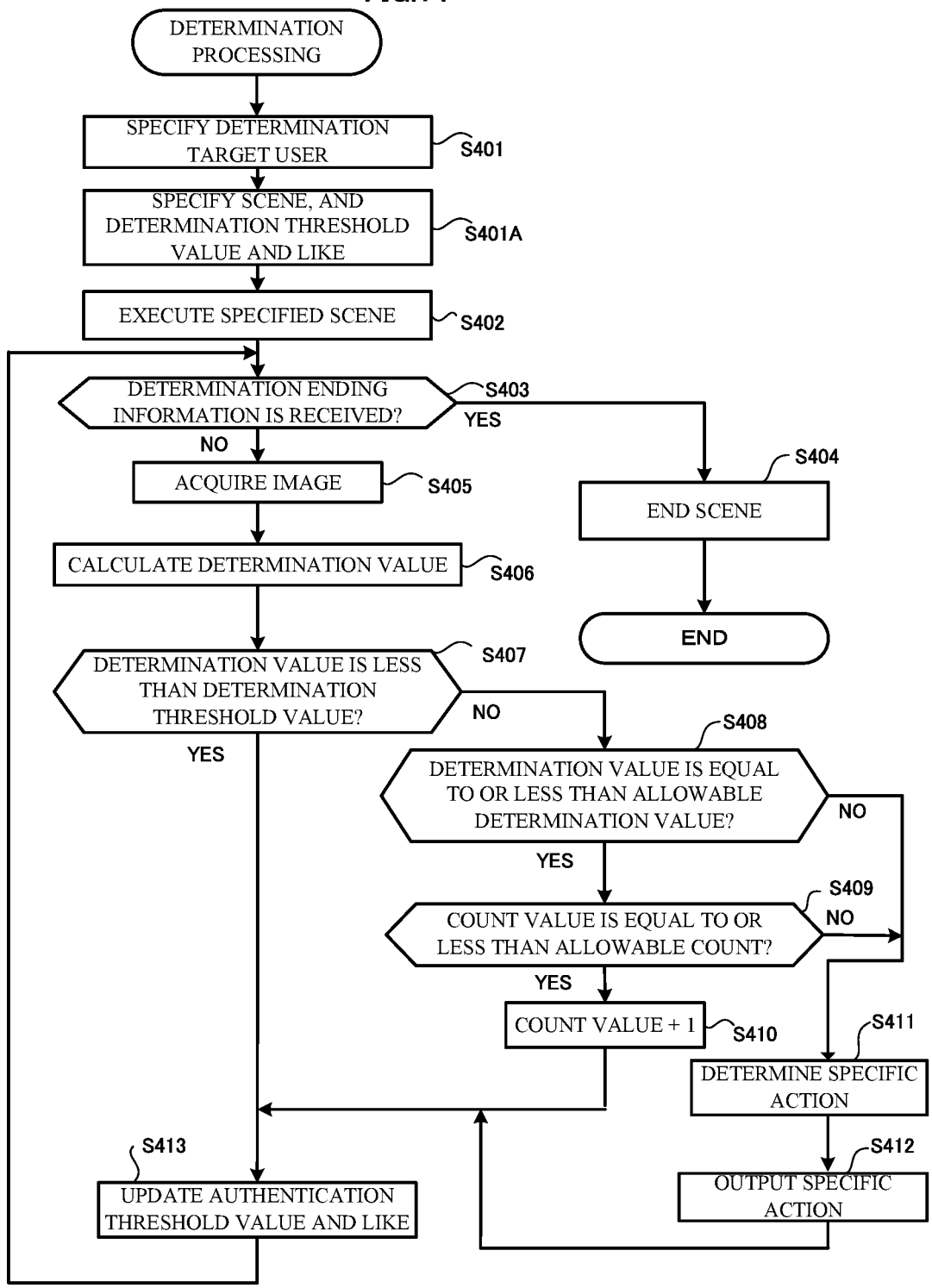

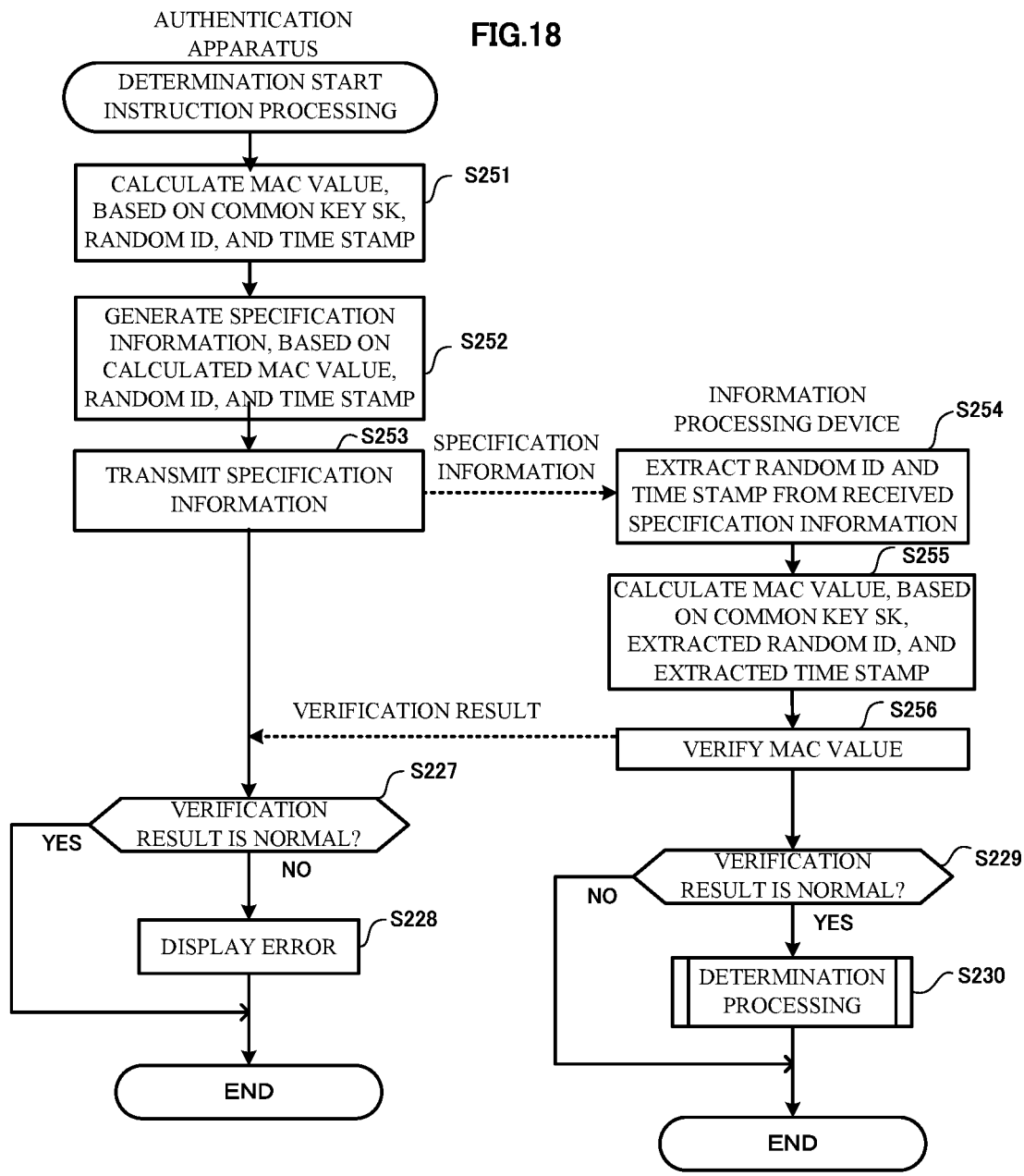

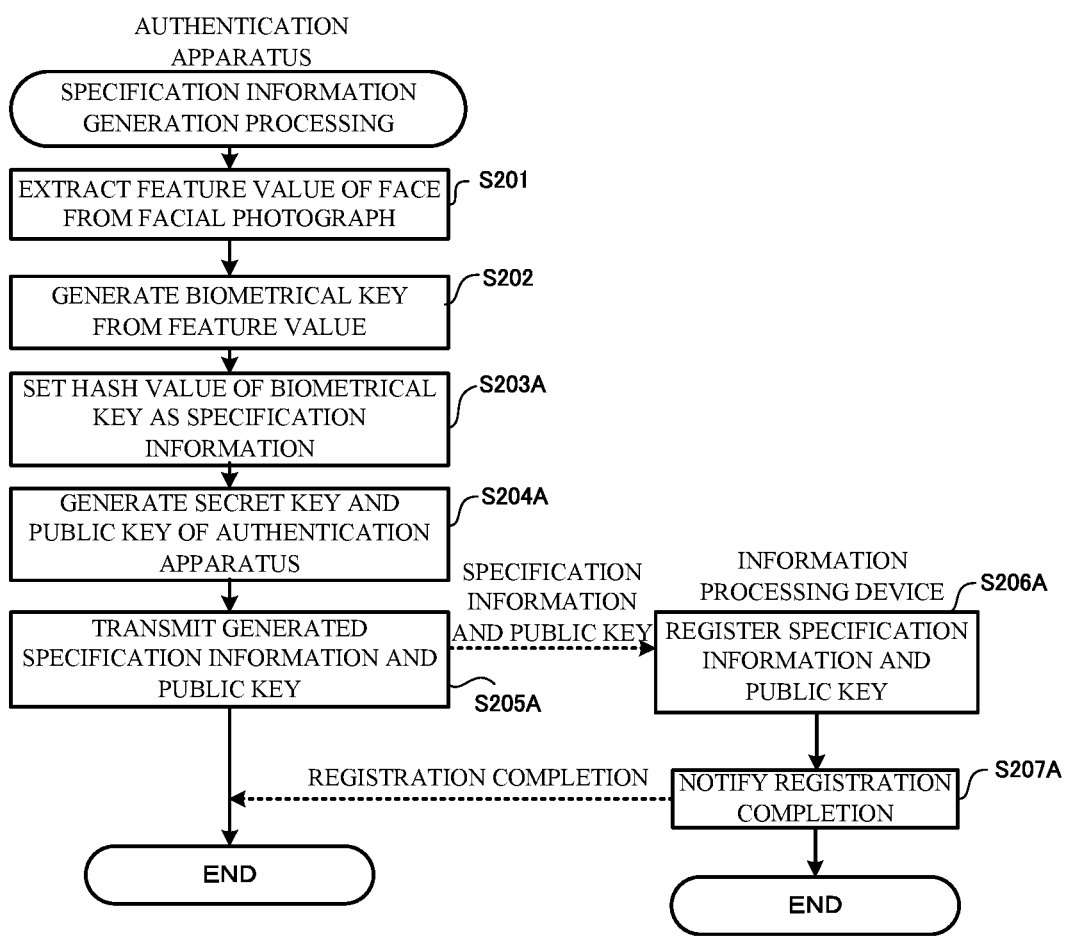

SYSTEM AND METHOD FOR PROVIDING SERVICE RELATED TO THE USER BASED ON BIOMETRIC AUTHENTICATION OF THE USER

Cross-Reference to Related Applications

This application is the U.S. National Stage of International Patent Application No. PCT/JP2021/042059, filed Nov. 16, 2021, which claims priority from Japanese Patent Application No. 2021-097393, filed Jun. 10, 2021.

TECHNICAL FIELD

The present disclosure relates to an authentication system, an authentication apparatus, an authentication method, and a program.

BACKGROUND ART

When a user uses various services online, user authentication for determining whether the user using the service is a valid user is performed in order to prevent unauthorized use. For example, Patent Literature 1 discloses a technology allowing a user to use a service when user authentication is performed by using an authentication method varying for each provided service, such as a facial image, a voiceprint, or a movement of the mouth when a specific word is spoken, and the user is authenticated to be the user himself or herself.

CITATION LIST

Patent Literature

Patent Literature 1: Unexamined Japanese Patent Application Publication No. 2020-113107

SUMMARY OF INVENTION

Technical Problem

However, since user authentication is performed by using an authentication method varying for each service, a user needs to preregister information required for authentication in a plurality of authentication systems. Therefore, there is a problem that a workload of a user in authentication is heavy. Further, the technology disclosed in Patent Literature 1 authenticates a user by a movement of the mouth when a specific word is spoken. However, there is a problem that a user cannot receive a service when the user forgets a keyword associated with the service.

The present disclosure solves the aforementioned problems, and an objective of the present disclosure is to provide an authentication system, an authentication apparatus, an authentication method, and a program that lighten a workload when a user receives a service and enable the user to stably receive the service.

Solution to Problem

In order to achieve the aforementioned objective, an authentication system according to the present disclosure includes:
an authentication apparatus to perform authentication of whether a user is the user himself or herself in a background; and
an information processing device including first pair key generation means for generating a first pair key including a first public key and a first secret key, the information processing device being configured to provide a service,
wherein the authentication apparatus includes:
biometric key generation means for, when authentication performed in the background is successful, generating a biometric key from biometric information of the user by a predetermined one-way function;
second pair key generation means for generating a second pair key including a second public key and a second secret key, based on the biometric key generated by the biometric key generation means and random information that is randomly generated information;
first common key generation means for acquiring the first public key generated by the first pair key generation means and generating a common key, based on the acquired first public key and the second secret key generated by the second pair key generation means; and
specification information generation means for generating specification information for specifying the user, based on the random information and the common key generated by the first common key generation means, and
the information processing device further includes service providing means for acquiring the specification information generated by the specification information generation means and providing a service related to the user specified by the acquired specification information.

Advantageous Effects of Invention

An authentication system according to the present disclosure provides a service by a user being specified by specification information generated by an authentication apparatus and therefore lightens a workload when a user receives a service and enables the user to stably receive the service.

BRIEF DESCRIPTION OF DRAWINGS

FIG. 5 is a diagram illustrating an information processing block in the authentication apparatus illustrated in FIG. 1;

FIG. 6A is a diagram illustrating a table in an authentication biometric information database for storing biometric information acquired by the authentication apparatus illustrated in FIG. 1;

FIG. 6B is a diagram illustrating a table in an authentication behavior information database for storing behavior information acquired by the authentication apparatus illustrated in FIG. 1;

FIG. 6C is a diagram illustrating an inclination information table in the authentication apparatus illustrated in FIG. 1;

FIG. 9 is a diagram illustrating an information processing block in the information processing device illustrated in FIG. 1;

FIG. 10A is a diagram illustrating an example of a reference information list stored in the information processing device illustrated in FIG. 1;

FIG. 10B is a diagram illustrating an example of action information stored in the information processing device illustrated in FIG. 1;

FIG. 11B is a flowchart illustrating the example of the authentication processing;

FIG. 13A is a flowchart illustrating an example of specification information generation processing;

FIG. 14 is a flowchart illustrating an example of determination processing;

FIG. 18 is a flowchart illustrating an example of determination start instruction processing in a modified example; and FIG. 19 is a flowchart illustrating an example of specification information generation processing in a modified example.

DESCRIPTION OF EMBODIMENTS

Figure 1:
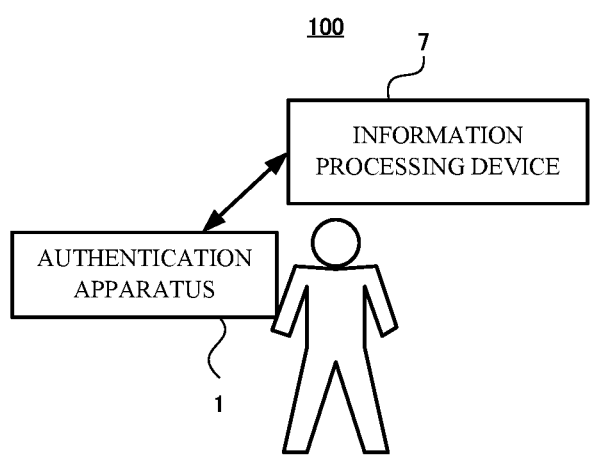
FIG. 1 is a diagram illustrating a configuration of an authentication system according to an embodiment of the present disclosure.

An authentication system, an authentication apparatus, an information processing method, and a program according to an embodiment of the present disclosure are described in detail below with reference to drawings. Note that identical or equivalent parts are given the identical sign in the diagrams. FIG. 1 is a diagram illustrating a configuration of an authentication system 100. As illustrated in FIG. 1, the authentication system 100 includes an authentication apparatus 1 and an information processing device 7; and the authentication apparatus 1 performs authentication of a user and, when the authentication is successful, generates specification information allowing specification of the user. Then, the information processing device 7 specifies a target user by using specification information and provides a service targeted for the user. A case of providing a service for determining necessity for an action on a specified user is described below as an example in the present embodiment.

The authentication apparatus 1 is a so-called smartphone or a tablet terminal, and the information processing device 7 is a personal computer, a smartphone, or a tablet terminal, according to the present embodiment. Further, for ease of understanding, a case of determining necessity for an action on a user attending an online class (Online Class 1 described in FIG. 10A) at the information processing device 7 is hereinafter described an example. For example, the authentication apparatus 1 and the information processing device 7 are communicably connected to each other by a wireless local area network (LAN), Wi-Fi (registered trademark), or Bluetooth (registered trademark).

Figure 2:
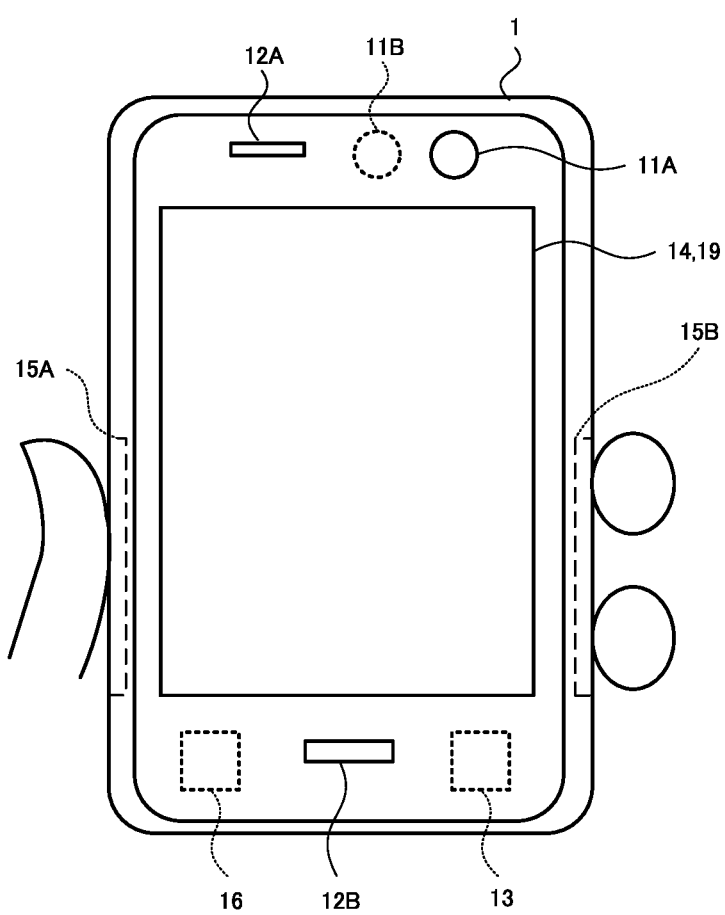
FIG. 2 is a front view of an authentication apparatus illustrated in FIG. 1.

FIG. 2 is a front view of the authentication apparatus 1. The illustrated authentication apparatus 1 is a so-called smartphone. The authentication apparatus 1 includes, on the front side, a front-facing camera 11A capturing an image of a face of a user, a speaker 12A, a microphone 12B being a microphone for telephone conversation, an inclination detector 13 detecting the inclination of the authentication apparatus 1, a touch panel serving as both an operation input device 14 and a display 19, a left fingerprint sensor 15A and a right fingerprint sensor 15B detecting fingerprints of a user, and a position detector 16 detecting the current position of the authentication apparatus 1. Further, the authentication apparatus 1 includes a main camera 11B that can capture images of a person, a scene, an object, and the like viewed from a user on the rear side.

The front-facing camera 11A and the main camera 11B are hereinafter collectively referred to as an image capture device 11. The speaker 12A and the microphone 12B being a microphone for telephone conversation are hereinafter collectively referred to as a voice input-output device 12. Further, the left fingerprint sensor 15A and the right fingerprint sensor 15B are hereinafter collectively referred to as a fingerprint detector 15.

Figure 3:
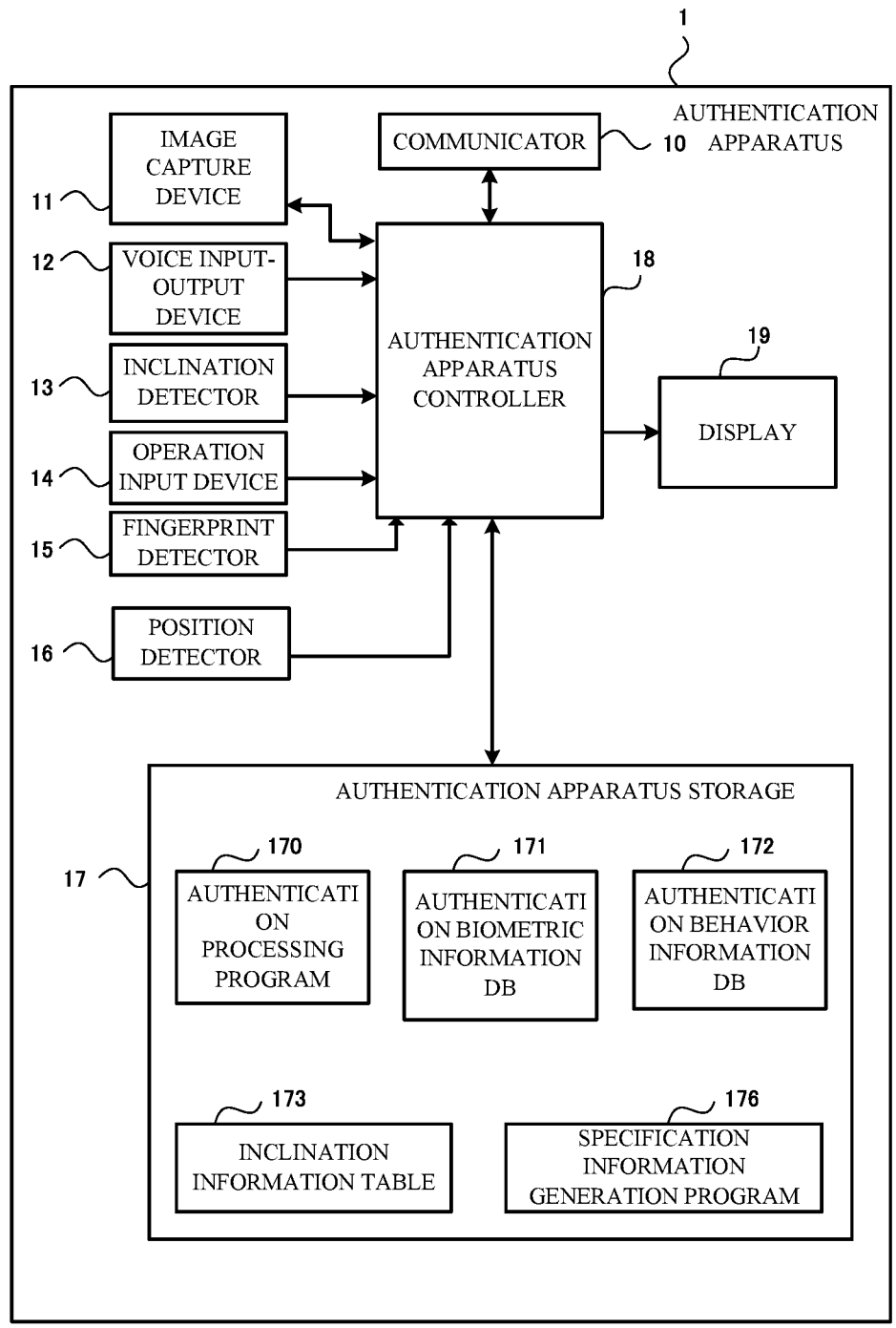
FIG. 3 is a block diagram of the authentication apparatus illustrated in FIG. 1.

FIG. 3 is a block diagram illustrating a configuration of the authentication apparatus 1. The authentication apparatus 1 includes a communicator 10, the image capture device 11, the voice input-output device 12, the inclination detector 13, the operation input device 14, the fingerprint detector 15, the position detector 16, an authentication apparatus storage 17, an authentication apparatus controller 18, and the display 19.

The communicator 10 includes a data communicator communicating with and transmitting and receiving various types of data to and from an external server, a cloud, the information processing device 7, and the like through an unillustrated communication network, and a voice communicator transmitting and receiving wireless signals for telephone communication to and from an unillustrated base station. The data communicator may be configured by using a wireless local area network (LAN), Wi-Fi (registered trademark), Bluetooth (registered trademark) or the like. Further, the voice communicator may be configured by using communication equipment transmitting and receiving wireless signals for telephone communication to and from a base station.

The image capture device 11 includes the front-facing camera 11A and the main camera 11B illustrated in FIG. 2. Various cameras capturing a static image or a dynamic image and allowing the captured static image or dynamic image to be acquired, such as a camera using an imaging element such as a charge coupled device (CCD) or a complementary metal oxide semiconductor (CMOS) image sensor, and a video camera, may be used in the image capture device 11.

The voice input-output device 12 includes the speaker 12A and the microphone 12B illustrated in FIG. 2. The speaker 12A outputs a voice received in a telephone conversation, music data externally acquired through a communication network, and the like. The microphone 12B is a device picking up a user voice.

The inclination detector 13 is a device that can detect the inclination, shaking, and the like of the authentication apparatus 1. The inclination detector 13 may be configured by using various sensors that can detect the inclination of the authentication apparatus 1, such as an acceleration sensor, an angle sensor, and a magnetic sensor detecting geomagnetism. The number of and the number of types of sensors constituting the inclination detector 13 may be one or more than one.

The operation input device 14 is a device that can input an operation by a user illustrated in FIG. 2. The fingerprint detector 15 is a sensor detecting fingerprints of a user. The fingerprint detector 15 includes the left fingerprint sensor 15A and the right fingerprint sensor 15B illustrated in FIG. 2. Without being limited to a fingerprint sensor, any type of sensor, equipment, or the like that can detect fingerprints of a user may be used as the fingerprint detector 15.

The position detector 16 is a device that can detect the current position of the authentication apparatus 1. The position detector 16 may be configured by using equipment that can detect the current position of the authentication apparatus 1, such as the Global Positioning System (GPS).

The authentication apparatus storage 17 includes an authentication processing program 170 for performing user authentication processing, an authentication biometric information database 171 in which biometric information of a user acquired by the authentication apparatus 1 is gathered, an authentication behavior information database 172 in which behavior information of a user acquired by the authentication apparatus 1 is gathered, an inclination information table 173 for storing an inclination state of the authentication apparatus 1, and a specification information generation program 176 for generating specification information for specifying a target user for whom a service is provided. Further, the authentication apparatus storage 17 stores various application programs executed by the authentication apparatus 1.

The authentication processing program 170 is a program performing processing of authenticating a user, based on biometric information and behavior information of the user acquired by the authentication apparatus 1. The authentication biometric information database 171 is a database for retaining information about biometric information of a user and an authentication value used for authentication.

The authentication behavior information database 172 is a database for retaining information about a user-specific behavior when operating the authentication apparatus 1, an acceptance condition of authentication, and the like. The user-specific behavior refers to a behavior unique to a user such as an action taken by the user when the user operates the authentication apparatus 1, the distance between a screen on the display 19 and the face of the user, a keystroke, the way the authentication apparatus 1 is held, the position in which the authentication apparatus 1 is used, a connection count to a specific communication network, or starting and operation of a specific application.

The inclination information table 173 is a table for storing the angle of inclination of the authentication apparatus 1 detected by the inclination detector 13, an acquisition date and time, and a standby time for acquisition. The specification information generation program 176 is a program generating specification information for specifying a target user for whom a service is provided. The specification information generation program 176 according to the present embodiment is a program generating specification information for specifying a user for whom necessity of an action is determined.

Details of the authentication processing program 170, the authentication biometric information database 171, the authentication behavior information database 172, the inclination information table 173, and the specification information generation program 176 are described later.

The authentication apparatus controller 18 executes various programs stored in the authentication apparatus storage 17. Further, the authentication apparatus controller 18 acquires various types of data from the communicator 10, the image capture device 11, the voice input-output device 12, the inclination detector 13, the operation input device 14, the fingerprint detector 15, and the position detector 16, processes the data, and stores the processed data into various databases and tables in the authentication apparatus storage 17. Further, by transmitting an instruction to capture an image to the image capture device 11, the authentication apparatus controller 18 can cause the image capture device 11 to capture an image at any timing.

The display 19 displays processing results of various programs executed by the authentication apparatus controller 18. Further, the display 19 can also display images captured by the image capture device 11, such as a static image and a dynamic image, data input from the operation input device 14, and the like. The display 19 is superposed on the operation input device 14 and constitutes the touch panel illustrated in FIG. 2.

Figure 4:
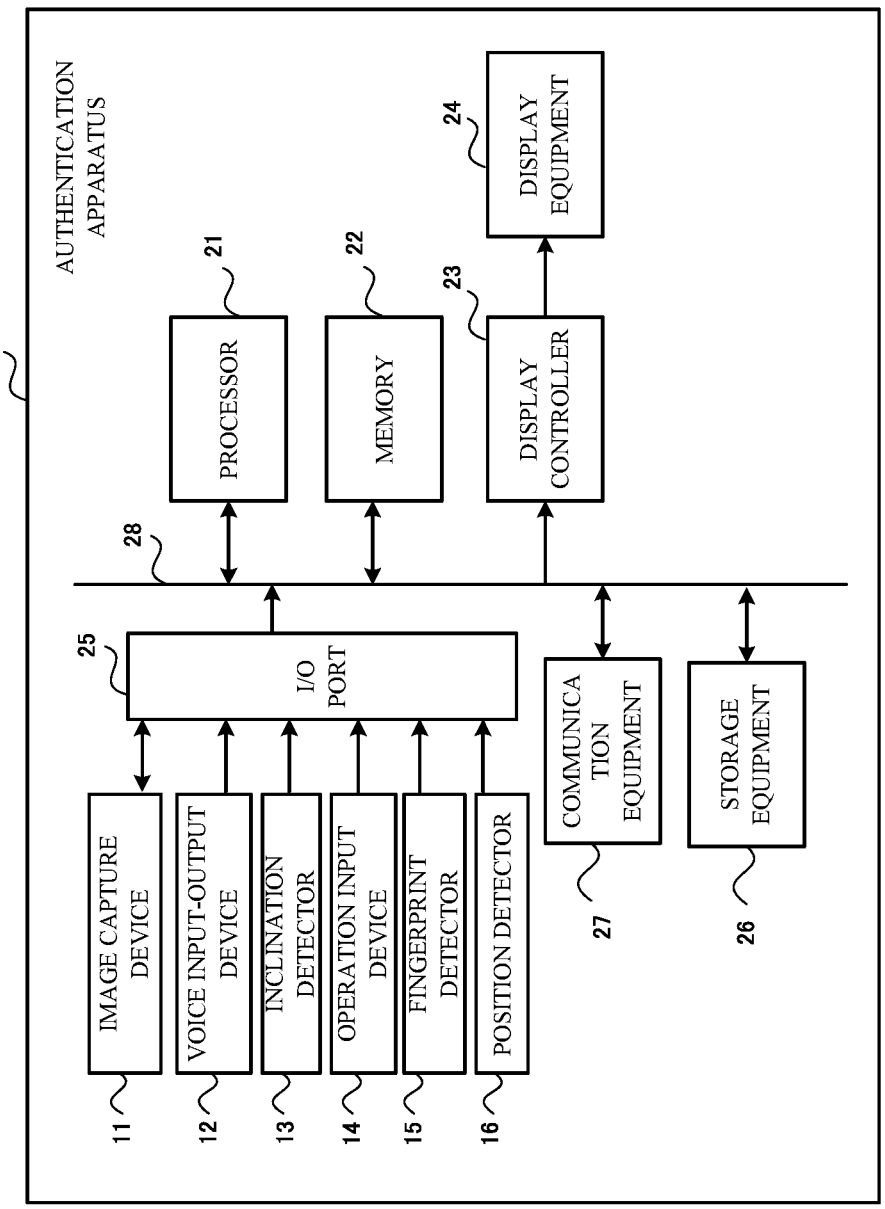
FIG. 4 is a diagram illustrating an example of a hardware configuration of the authentication apparatus illustrated in FIG. 1.

Next, an example of a hardware configuration of the authentication apparatus 1 is described referring to FIG. 4. The authentication apparatus 1 includes a processor 21 executing various programs, a memory 22 for loading various programs, a display controller 23 outputting various types of display data, display equipment 24 displaying various types of display data, an I/O port 25 for connecting the image capture device 11, the voice input-output device 12, and the like, storage equipment 26 storing various programs and various types of data, and communication equipment 27 communicating with the outside and transmitting and receiving various types of data. The processor 21, the memory 22, the display controller 23, the display equipment 24, the I/O port 25, the storage equipment 26, and the communication equipment 27 are interconnected through a data bus 28.

The processor 21 reads various programs stored in the storage equipment 26, loads the programs into the memory 22, and executes the programs. The processor 21 may be configured by using a processing unit such as a central processing unit (CPU) or a micro-processing unit (MPU). Further, the memory 22 may be configured by using a storage element such as a volatile or nonvolatile semiconductor memory such as a random access memory (RAM) or a flash memory, and a storage medium.

The display controller 23 is a controller outputting various types of display data to the display equipment 24. The display controller 23 may be configured by using an image signal output device such as a video card, a graphics processing unit (GPU), or a graphics board. Further, the display equipment 24 may be configured by using a display device such as a liquid crystal display (LCD) or an organic electroluminescence (EL) monitor.

The I/O port 25 is a connection port connectable to the image capture device 11, the voice input-output device 12, the inclination detector 13, the operation input device 14, the fingerprint detector 15, and the position detector 16. The I/O port 25 may be configured by using various ports connectable to equipment, such as a universal serial bus (USB) port and an IEEE 1394 port.

The storage equipment 26 is equipment storing various programs executed by the processor 21 and various types of data for use in various programs. The storage equipment 26 may be configured by using a storage device such as a hard disk drive (HDD) or a solid state drive (SSD).

The communication equipment 27 includes a data communicator communicating with and transmitting and receiving various types of data to and from the information processing device 7 illustrated in FIG. 1, and a voice communicator transmitting and receiving wireless signals for telephone communication to and from an unillustrated base station. The data communicator may be configured by using a wireless LAN, Wi-Fi (registered trademark), Bluetooth (registered trademark), or the like. Further, the voice communicator may be configured by using communication equipment transmitting and receiving wireless signals for telephone communication to and from a base station.

By executing the authentication processing program 170 and the specification information generation program 176 stored in the authentication apparatus storage 17 in the authentication apparatus 1 illustrated in FIG. 3 by the aforementioned processor 21, an information processing block (each functional component) illustrated in FIG. 5 is implemented in the authentication apparatus controller 18. Thus, the authentication apparatus 1 can authenticate a user to be the user himself or herself, based on biometric information such as an image of the face, a fingerprint, and a voiceprint of the user himself or herself, and behavior information such as a specific action taken by the user when the user operates the authentication apparatus 1 and an operation state and can execute various types of processing in the authentication apparatus 1.

The information processing block implemented by the processor 21 includes an authentication information acquirer 181 acquiring biometric information and behavior information for authentication from the communicator 10, the image capture device 11, and the like, an authenticator 182 authenticating whether a user is the user himself or herself, a display processor 183 causing the display 19 to display an authentication result, an authentication information updater 184 updating information in various databases and tables stored in the authentication apparatus storage 17 in accordance with an instruction from the authenticator 182, a data transmitter-receiver 185 for transmitting and receiving data to and from the information processing device 7 illustrated in FIG. 1 through the communicator 10, a specification information generator 186 generating specification information data, and a processing device 187 executing various other types of processing.

The authentication information acquirer 181 acquires biometric information and behavior information for authentication from the communicator 10, the image capture device 11, and the like. The authenticator 182 performs user authentication, based on the biometric information and the behavior information for authentication acquired from the authentication information acquirer 181 and an authentication value, an acceptance condition, and the like stored in various databases in the authentication apparatus storage 17.

The display processor 183 receives a user authentication result from the authenticator 182 and causes the display 19 to display a message, an image, and/or the like based on the authentication result. The authentication information updater 184 updates data stored in various databases and tables stored in the authentication apparatus storage 17 in accordance with an instruction from the authenticator 182.

The data transmitter-receiver 185 transmits and receives data to and from the information processing device 7 illustrated in FIG. 1 through the communicator 10. The specification information generator 186 generates specification information for specifying a target user for whom a service is provided, that is, specification information for specifying a user for whom necessity of an action is determined. The processing device 187 executes various types of necessary processing when a user using the authentication apparatus 1 is authenticated to be the user himself or herself by the authenticator 182.

Next, structures of tables and data in the authentication biometric information database 171, the authentication behavior information database 172, and the inclination information table 173 stored in the authentication apparatus storage 17 are described below referring to FIG. 6A to FIG. 6C. First, as illustrated in FIG. 6A, the table in the authentication biometric information database 171 stores an authentication value determined by comparing a biometric information type such as face or voice, registered information being biometric information of the user himself or herself, and biometric information acquired by the authentication information acquirer 181 illustrated in FIG. 5.

The registered information stored in the table in the authentication biometric information database 171 is biometric information of the user himself or herself. The registered information is information preregistered before authentication processing is performed by the authentication apparatus 1 and is updated when the user is authenticated to be the user himself or herself. For example, the registered information stores a feature value determined from a facial image when the biometric information type is face, voice data, a feature value determined from the voice data, or both voice data and a feature value thereof when the biometric information type is voice, iris data when the biometric information type is iris, and a feature value determined from an image of a fingerprint when the biometric information type is fingerprint.

According to the present embodiment, determination of similarity of biometric information is performed based on an authentication value. An authentication value is a value determined based on a comparison result between registered information and biometric information acquired by the authentication information acquirer 181 illustrated in FIG. 5. The authentication value approaches 0 when the registered information and the biometric information acquired by the authentication information acquirer 181 are similar and approaches 1 when the two are not similar. The authentication biometric information database 171 includes the mean value of authentication values, an authentication threshold value being a threshold value for determining an authentication value, and an allowable authentication value acquired by including an allowable authentication range value indicating a gray situation of a user into the authentication threshold value.

First, the mean value of authentication values is the mean value of authentication values determined by comparing registered information with biometric information acquired by the authentication information acquirer 181. The authentication threshold value is a reference value for determining a user to be the user himself or herself when an authentication value determined based on a comparison result between registered information and biometric information acquired by the authentication information acquirer 181 is less than the authentication threshold value.

The authentication threshold value is a value varying by status of user authentication, and an upper limit thereof is predetermined. The upper limit is a value determined in such a way that a user should not be authenticated to be the user himself or herself, based solely on biometric information, when an authentication value is equal to or greater than the upper limit. For example, a default value of the authentication threshold value is set to 0.4 between an authentication value 0 being approached when registered information and biometric information acquired by the authentication information acquirer 181 are similar and an authentication value 1 being approached when the two are not similar. In this case, the upper limit of the authentication threshold value is set to a value acquired by adding 0.05 being half of 10% of the difference between the authentication value 0 being approached when the registered information and the biometric information are similar and the authentication value 1 being approached when the two are not similar to the default value of the authentication threshold value, that is, 0.45. The default value of the authentication threshold value and the added value may vary by group such as an age group or a gender of a user or may vary for each individual.

Further, the allowable authentication value is a reference value for determining a user not to be the user himself or herself when an authentication value determined based on a comparison result between registered information and biometric information acquired by the authentication information acquirer 181 is equal to or greater than the allowable authentication value. As described above, the allowable authentication value is a value acquired by including an allowable authentication range value indicating a gray situation of a user into the authentication threshold value. Therefore, the allowable authentication value is a value varying with variation of the authentication threshold value and the allowable authentication range value.

An upper limit is predetermined for the allowable authentication value and is referred to as a maximum allowable authentication value. The maximum allowable authentication value is a value determined in such a way that a user should be determined to be another person when an authentication value is equal to or greater than the maximum allowable authentication value. For example, the maximum allowable authentication value is set to 0.5 being a midpoint between the authentication value 0 being approached when registered information and biometric information acquired by the authentication information acquirer 181 are similar and the authentication value 1 being approached when the two are not similar.

A value between the authentication threshold value and the allowable authentication value is referred to as an allowable authentication range value. The allowable authentication range value is a value indicating a situation in which whether a user is the user himself or herself is gray. When an authentication value is within the allowable authentication range value, determination of whether a user is the user himself or herself is not performed solely by biometric information, and determination including user-specific behavior information is performed. Specifically, when user-specific behavior information meets an acceptance condition in a case of an authentication value being within the allowable authentication range value, a user is authenticated to be the user himself or herself.

Further, when user-specific behavior information does not meet the acceptance condition in the case of an authentication value being within the allowable authentication range value, a user is not authenticated to be the user himself or herself. User authentication based on behavior information is hereinafter referred to as supplementary authentication. The allowable authentication range value is a value predetermined in such a way that a user may be for the most part considered as the user himself or herself when an authentication value falls within the range. For example, the allowable authentication range value is set to 0.08 being a value equal to or less than 10% of the difference between the authentication value 0 being approached when registered information and biometric information acquired by the authentication information acquirer 181 are similar and the authentication value 1 being approached when the two are not similar.

When the authentication threshold value reaches the upper limit, the allowable authentication range value is set to a value acquired by subtracting the upper limit of the authentication threshold value from the maximum allowable authentication value. For example, assuming the upper limit of the authentication threshold value to be 0.45 and the maximum allowable authentication value to be 0.5, the allowable authentication range value is 0.05. Accordingly, when the authentication threshold value reaches the upper limit, the value of the allowable authentication range value takes a value smaller than a value in a case of the authentication threshold value not reaching the upper limit.

Next, the table in the authentication behavior information database 172 is described below referring to FIG. 6B. The table in the authentication behavior information database 172 stores a user behavior type such as communication connection or event execution, acquired information acquired by the authentication information acquirer 181 illustrated in FIG. 5, the latest status in each behavior, and an acceptance condition of each behavior.

For example, acquired information stores a destination address, a service set identifier (SSID), a basic service set identifier (BSSID), or the like when the behavior type is communication connection, location information such as a name and an address of a location where an event previously retained in a schedule book takes place when the behavior type is event execution, a distance when the behavior type is the distance between the face and the terminal device, and a name, an identifier (ID), or the like indicating a connected device when the behavior type is device connection.

For example, the latest status in each behavior is the total count of past connections to a communication connection destination indicated in acquired information when the behavior type is communication connection. An initial value of the total count of connections to a communication connection destination or the like is set to 0, and the count is added with a connection to the communication connection destination, or the like. Further, when the behavior type is event execution, the distance between a location stored in acquired information and the current location of the user is stored.

When the behavior type is the distance between the face and the authentication apparatus 1, the mean distance between the face and the authentication apparatus 1 calculated at the time of the user being authenticated as the user himself or herself in the past is stored. The mean distance between the face and the authentication apparatus 1 is updated every time the user is authenticated to be the user himself or herself. An initial value of the mean distance between the face and the authentication apparatus 1 is set to a distance determined at the time of preregistration of the biometric information illustrated in FIG. 6A before authentication of the user himself or herself is performed by the authentication apparatus 1.

Further, when the behavior type is device connection, whether a device indicated by a name, an ID, or the like stored in acquired information is connected is stored. For example, device connection refers to connection between a device and the authentication apparatus 1 pair-set by Bluetooth (registered trademark). An acceptance condition of each behavior is a condition predetermining a condition by which reliability of the behavior can be guaranteed.

Next, FIG. 6C illustrates the table in the inclination information table 173. The inclination information table 173 stores an angle indicating the inclination of the authentication apparatus 1 and being acquired from the inclination detector 13 illustrated in FIG. 5, an acquisition date and time at which the angle is acquired, and a standby time being an interval for detecting inclinations. Every time the standby time elapses, an angle indicating the inclination of the authentication apparatus 1 is acquired from the inclination detector 13 by the authentication information acquirer 181 illustrated in FIG. 5 and is updated. Further, when the angle is updated, the acquisition date and time at which the angle is acquired is also updated.

Figure 7:
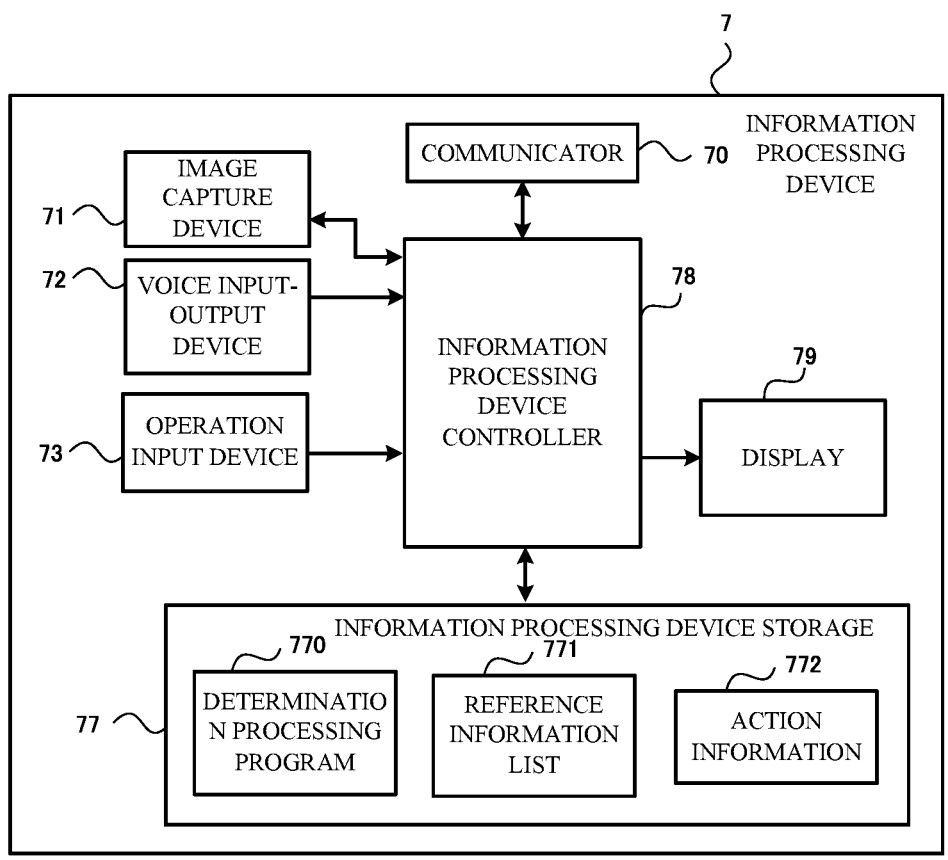
FIG. 7 is a block diagram of an information processing device illustrated in FIG. 1.

Next, a configuration of the information processing device 7 is described. The information processing device 7 is a terminal specifying a service provision target user, based on specification information generated by the authentication apparatus 1 and providing the service for the specified user. As described above, the information processing device 7 according to the present embodiment provides a user specified based on specification information with a service for determining necessity for an action. FIG. 7 is a block diagram illustrating a configuration of the information processing device 7. As described above, the information processing device 7 is a personal computer, a smartphone, or a tablet terminal and includes a communicator 70, an image capture device 71, a voice input-output device 72, an operation input device 73, an information processing device storage 77, an information processing device controller 78, and a display 79. The information processing device 7 may further include an inclination detector 13, a fingerprint detector 15, and a position detector 16, similarly to the authentication apparatus 1.

The communicator 70, the image capture device 71, the voice input-output device 72, and the operation input device 73 in the information processing device 7 are similar to the communicator 10, the voice input-output device 12, and the operation input device 14 in the authentication apparatus 100, and therefore description thereof is omitted.

The image capture device 71 includes a camera capturing an image of a user being a target of determination of necessity of an action. The image capture device 71 in this example captures an image of a user attending an online class. Various cameras capturing a static image or a dynamic image and allowing the captured static image or dynamic image to be acquired, such as a camera using an imaging element such as a charge coupled device (CCD) or a complementary metal oxide semiconductor (CMOS) image sensor, and a video camera, may be used in the image capture device 71, similarly to the image capture device 11.

The information processing device storage 77 includes a determination processing program 770 for performing determination processing of determining necessity for an action on a determination target user, a reference information list 771 indicating reference information based on a user and a scene, and action information 772. Further, the information processing device storage 77 stores various application programs executed by the information processing device 7.

The determination processing program 770 is a program performing the determination processing of determining necessity for an action on a user, based on an image of the user captured by the image capture device 71. The reference information list 771 is a list of a user specified by using specification information generated by the authentication apparatus 1, and reference information (a determination threshold value) for each scene related to the user. The action information 772 is a database indicating a specific action being executed when an action on a user is determined to be necessary.

Details of the determination processing program 770, the reference information list 771, and the action information 772 are described later.

The information processing device controller 78 executes various programs (including an online class program) stored in the information processing device storage 77. Further, the information processing device controller 78 acquires various types of data from the communicator 70, the image capture device 71, the voice input-output device 72, and the operation input device 73, processes the data, and stores the data into various databases, tables, and the like in the information processing device storage 77. Further, the information processing device controller 78 causes the image capture device 71 to capture an image of a determination target user by transmitting an instruction to capture an image to the image capture device 71.

The display 79 displays processing results of various programs (including the online class program) executed by the information processing device controller 78. Further, the display 79 can also display images captured by the image capture device 71 such as a static image and a dynamic image, data input from the operation input device 73, and the like. When the information processing device 7 is a smartphone or a tablet terminal, the display 79 may be superposed on the operation input device 73 in such a way as to configure a touch panel.

Figure 8:
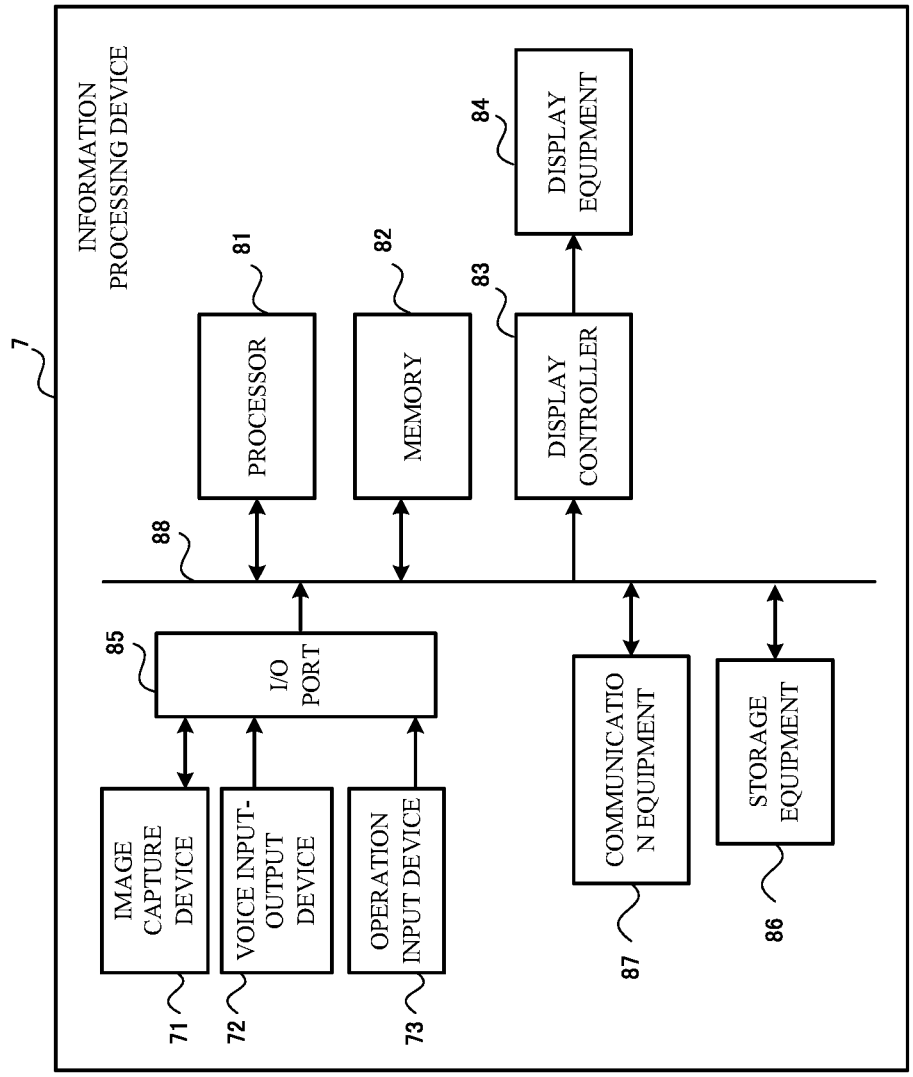
FIG. 8 is a diagram illustrating an example of a hardware configuration of the information processing device illustrated in FIG. 1.

Next, an example of a hardware configuration of the information processing device 7 is described referring to FIG. 8. The information processing device 7 includes a processor 81 executing various programs, a memory 82 for loading various programs, a display controller 83 outputting various types of display data, display equipment 84 displaying various types of display data, an I/O port 85 for connecting the image capture device 71, the voice input-output device 72, and the like, storage equipment 86 storing various programs and various types of data, and communication equipment 87 communicating with the outside and transmitting and receiving various types of data, similarly to the authentication apparatus 1. The processor 81, the memory 82, the display controller 83, the display equipment 84, the I/O port 85, the storage equipment 86, and the communication equipment 87 are interconnected through a data bus 88. The processor 81, the memory 82, the display controller 83, the display equipment 84, the I/O port 85, the storage equipment 86, the communication equipment 87, and the data bus 88 are similar to the processor 21, the memory 22, the display controller 23, the display equipment 24, the I/O port 25, the storage equipment 26, the communication equipment 27, and the data bus 28 in the authentication apparatus 1, and therefore description thereof is omitted.

By executing the determination processing program 770 stored in the information processing device storage 77 in the information processing device 7 illustrated in FIG. 7 by the processor 81, an information processing block (each functional component) is implemented in the information processing device controller 78 illustrated in FIG. 9. Thus, the information processing device 7 can execute processing such as determination of necessity for an action on a user attending an online class.

The information processing block implemented by the processor 21 includes a determination information acquirer 781 acquiring information for determination from the communicator 10, the image capture device 11, and the like, a determiner 782 determining necessity for an action, the display 79 causing the display 79 to display a determination result and action information, a determination information updater 784 updating, in accordance with an instruction from the determiner 782, information in various databases and tables including the reference information list 771 stored in the information processing device storage 77, a data transmitter-receiver 785 for transmitting and receiving data to and from the authentication apparatus 1 illustrated in FIG. 1 through the communicator 70, and a processing device 787 executing various other types of processing.

The determination information acquirer 781 acquires determination information for determination from the communicator 10, the image capture device 11, and the like. The determiner 782 performs determination of necessity for an action, based on determination information acquired from the determination information acquirer 781, and a determination threshold value and the like indicated by the reference information list 771 in the information processing device storage 77.

Specifically, the determination information acquirer 781 acquires specification information from the authentication apparatus 1 through the communicator 10. Further, the determination information acquirer 781 acquires an image of a user attending the online class from the image capture device 11 as determination target information. Further, the determination information acquirer 781 acquires scene information for identifying a determination target scene selected by an operation on the operation input device 73. In addition, the determination information acquirer 781 may acquire information input from the voice input-output device 72. Based on the specification information and the scene information acquired by the determination information acquirer 781, the determiner 782 specifies a determination target user from the reference information list 771 in the information processing device storage 77 and specifies a determination target scene selected by the user and a determination threshold value and the like based on the user and the scene. Further, the determiner 782 calculates a determination value, based on the acquired image of the user, and determines necessity for an action on the user by comparing the determination value with the specified determination threshold value and the like. For example, a determination value may be calculated by a computing equation calculating a comprehensive score related to a plurality of elements such as the height of a line of sight of the user, a movement of the head, and a movement of a hand. Further, the computing equation has only to be predetermined, and for example, a determination value may be calculated by varying weighting for each of a plurality of elements such as the height of a line of sight of the user, a movement of the head, and a movement of a hand.

The display processor 783 receives a determination result of necessity for an action from the determiner 782 and causes the display 79 to display a message, an image, and/or the like based on the determination result. Specifically, when the determiner 782 determines that an action is necessary, the display processor 783 determines a specific action from the action information 772 in the information processing device storage 77 in cooperation with the processing device 787, based on an image of the user acquired by the determination information acquirer 781, and displays the determined specific action. While an example of causing the display 79 to display a message, an image, and/or the like as a specific action is described in this example, an action of, for example, causing the voice input-output device 72 to output a voice may be added.

In accordance with an instruction from the determiner 782, the determination information updater 784 updates data stored in various databases and tables such as the reference information list 771 and the action information 772 stored in the information processing device storage 77. Specifically, the determination information updater 784 performs machine learning with a determination result and the like by the determiner 782 as input data in such a way that determination by the determiner 782 becomes more precise and updates contents of the reference information list 771 and the action information 772 stored in the information processing device storage 77.

The data transmitter-receiver 785 transmits and receives data to and from the authentication apparatus 1 illustrated in FIG. 1 through the communicator 70. As described above, the processing device 787 executes processing of determining a specific action from the action information 772 in the information processing device storage 77 in cooperation with the display processor 783, and various other types of processing.

Next, data structures of the reference information list 771 and the action information 772 stored in the information processing device storage 77 are described referring to FIG. 10A and FIG. 10B. The reference information list 771 illustrated in FIG. 10A is a list of reference information based on a user and a scene and stores a determination threshold value and the like based on a target user specified by specification information and a determination target scene specified by selection through a user operation on the operation input device 73 as reference information, as illustrated in FIG. 10A. While details are described later, when the information processing device 7 according to the present embodiment confirms validity of specification information generated by the authentication apparatus 1, a determination target scene of a user and a list of reference information are stored and registered in association with the specification information as the reference information list 771 illustrated in FIG. 10A (advanced registration). Then, based on transmission of the specification information from the authentication apparatus 1, the information processing device 7 performs, for example, challenge-response authentication and specifies a target user from the reference information list 771 illustrated in FIG. 10A. Further, the information processing device 7 specifies a determination target scene, based on the scene information acquired through the selection operation on the operation input device 73, and specifies reference information related to the determination target scene of the user from the reference information list 771 illustrated in FIG. 10A. Subsequently, the information processing device 7 specifies a specific action and the like from the action information 772 illustrated in FIG. 10B. Therefore, the information processing device 7 specifies a target user, based on specification information received from the authentication apparatus 1, specifies a determination target scene of the user through a selection operation, and specifies a determination threshold value, a specific action, and the like, based on the reference information list 771 and the action information 772.

A determination threshold value indicates a reference value for determining whether an action is unnecessary; and when a determination value calculated based on an acquired image of a user is less than the determination threshold value, an action on the user is determined to be unnecessary. An allowable determination value is a value compared with a determination value when the determination value is equal to or greater than the determination threshold value and is a value indicating an upper limit of a gray zone in terms of whether an action on a user is necessary or unnecessary. Specifically, an action on a user A being a user attending an online class is determined to be unnecessary when a determination value calculated based on an image of the user A is less than 3.00 being a determination threshold value described in FIG. 10A, the determination value is determined to be in a gray zone when the determination value is equal to or less than 3.50, and an action is determined to be necessary when the determination value is a value exceeding 3.50. Further, as illustrated, a different determination threshold value and the like are set to the same scene for each user such as the user A and a user B. Further, an action is determined to be necessary when a count of gray zone determinations exceeds an allowable count, according to the present embodiment, and therefore an allowable count is preset as illustrated in FIG. 10A. For example, when a count of gray zone determinations in a predetermined period (for example, within one hour) exceeds 5, an action on the user A is determined to be necessary as illustrated in FIG. 10A. While an example of determining whether an action is necessary, based on a count of gray zone determinations as an allowable count, is described in the illustrated example, a proportion of gray zone determinations or a count of consecutive gray zone determinations may be set as a reference. While an example of an allowable count being common among users and varying by scene is described in the illustrated example, an allowable count may vary by user and scene.

The action information 772 illustrated in FIG. 10B is a database indicating a specific action to be executed when an action on a user is determined to be necessary and stores a specific action based on a reference value for each scene and each user, as illustrated in FIG. 10B. The action information 772 is referred to when an action on a user is determined to be necessary. Specifically, when an action on the user A being a user attending an online class is determined to be necessary, the height of a line of sight of the user A is calculated based on an acquired image of the user A. Then, as a result of comparison with a reference described in FIG. 10B, a message "WAKE UP" as described in FIG. 10B is displayed when a state of the height of the line of sight being less than 20 cm continues for 1 minute or longer, and when the state of the height of the line of sight being less than 20 cm continues for 30 seconds to 1 minute, a message "DON'T SLEEP" as described in FIG. 10B is displayed. A specific action may vary by target user for the identical scene or may vary by past action count. For example, voice output may be performed together as a specific action on a user for whom an action has been determined to be necessary five times or greater in the past in an online class. In other words, the action information 772 may store a specific action varying by past action count.

The above describes the configurations of the authentication apparatus 1 and the information processing device 7 in the authentication system 100. Next, operation of the authentication apparatus 1 and the information processing device 7 is described referring to FIG. 11A to FIG. 14. An example of determining necessity for an action on a user attending an online class as described above is described in the present embodiment.

First, user authentication is performed in authentication processing in the authentication apparatus 1. Then, by determination instruction processing being executed, determination is started by generating specification information when the authentication is successful and transmitting the generated specification information to the information processing device 7. The determination instruction processing includes specification information generation processing of generating specification information. The information processing device 7 receiving the specification information starts attendance of an online class in response to the reception and performs determination processing of determining necessity for an action on a user specified by the specification information and a scene selected by the user. Note that the authentication processing in the authentication apparatus 1 is processing performed in the background.

Figure 11A:
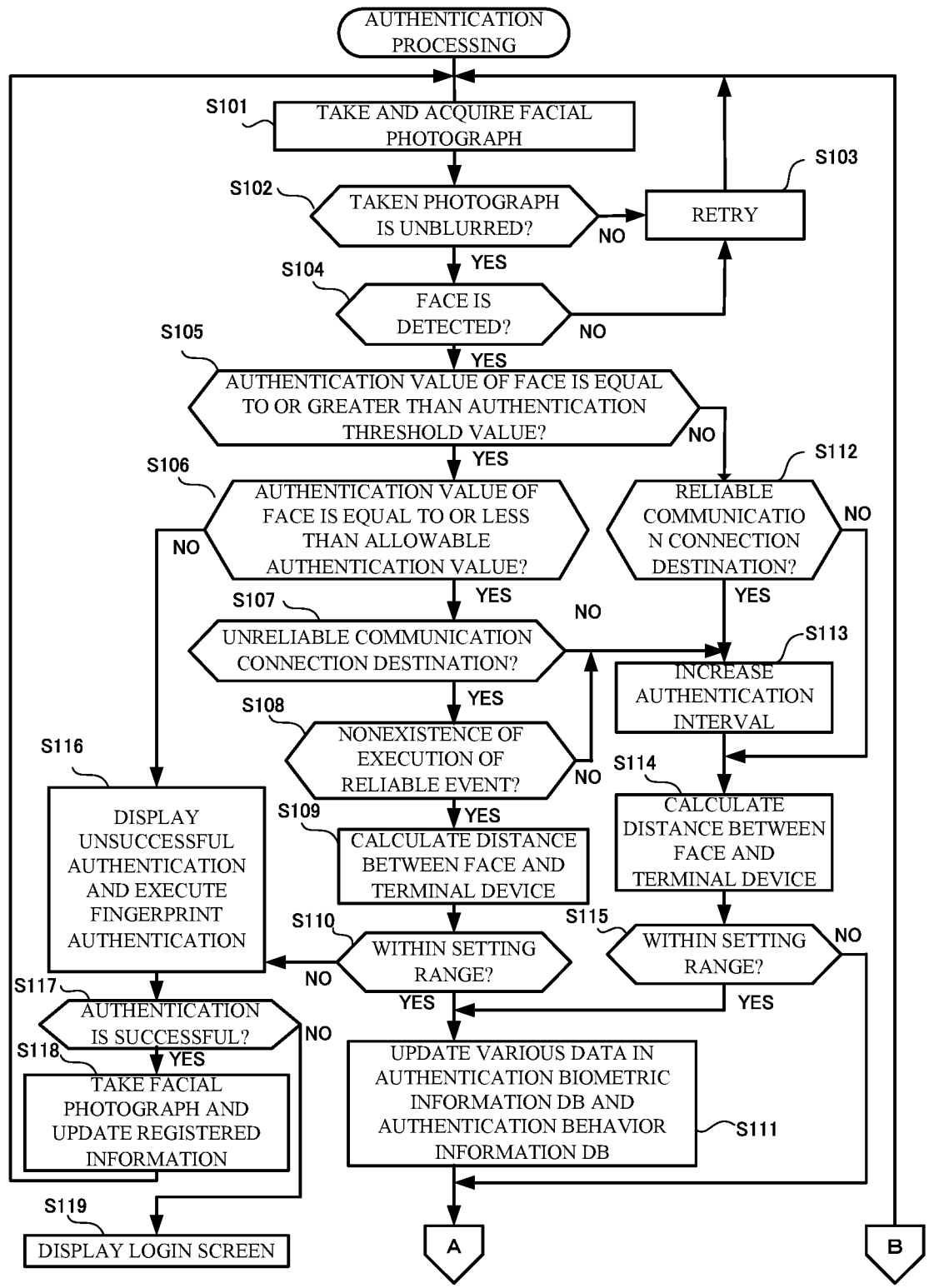
FIG. 11A is a flowchart illustrating an example of authentication processing.

First, the authentication processing is described with reference to FIG. 11A and FIG. 11B. When completing execution of initialization processing after power is turned on or when returning from a sleep state, the authentication apparatus 1 enters a lock state in which operation of each function is not permitted until authentication is successful. When the lock state is entered or when authentication is requested during operation of each function, the authentication apparatus controller 18 illustrated in FIG. 3 executes the authentication processing program 170 stored in the authentication apparatus storage 17 and determines whether a user is the user himself or herself. Further, it is assumed that a facial image of a user is used as biometric information. The authentication apparatus controller 18 executing the authentication processing and the authentication processing correspond to authentication means and an authentication step, respectively.

When the authentication processing is started, the authentication information acquirer 181 illustrated in FIG. 5 causes the image capture device 11 to take a facial photograph of a user operating the authentication apparatus 1. Specifically, the authentication information acquirer 181 causes the front-facing camera 11A to take a facial photograph of the user facing the front of the authentication apparatus 1. Thus, the authentication information acquirer 181 acquires the taken facial photograph of the user from the image capture device 11 (Step S101).

Next, the authentication information acquirer 181 determines whether the acquired facial photograph of the user is unblurred (Step S102). When the facial photograph of the user is not unblurred (Step S102: NO), the authentication information acquirer 181 causes the image capture device 11 to retry taking a facial photograph of the user (Step S103). Further, when the facial photograph of the user is unblurred (Step S102: YES), the authentication information acquirer 181 determines whether the face of the user can be detected from the facial photograph of the user caused to be taken by the image capture device 11 (Step S104).

When the face of the user cannot be detected from the facial photograph of the user (Step S104: NO), the authentication information acquirer 181 causes the image capture device 11 to retry taking a facial photograph of the user (Step S103). When the face of the user cannot be detected from the facial photograph of the user, an action such as locking the operation in order to prevent the currently operating user from further performing operation, or displaying a message prompting use of another authentication method may be taken. Further, when the face of the user is detected from the facial photograph of the user (Step S104: YES), the authentication information acquirer 181 determines a feature value of the image of the detected face of the user. The authentication information acquirer 181 transmits the determined feature value of the facial image of the user to the authentication determiner 182.

The authentication determiner 182 acquires the authentication biometric information database 171 stored in the authentication apparatus storage 17 illustrated in FIG. 3. The authentication determiner 182 acquires a feature value of a facial image stored in registered information associated with "face" out of biometric information types, and an allowable authentication value and an authentication threshold value of an authentication value from the table in the authentication biometric information database 171 illustrated in FIG. 6A. The authentication determiner 182 compares the feature value of the facial image in the registered information acquired from the authentication biometric information database 171 with the feature value of the facial image received from the authentication information acquirer 181 and determines an authentication value of the face, based on the comparison result. The authentication determiner 182 determines whether the determined authentication value of the face is equal to or greater than the authentication threshold value acquired from the authentication biometric information database 171 (Step S105).

When the determined authentication value of the face is equal to or greater than the authentication threshold value (Step S105: YES), the authentication determiner 182 determines whether the determined authentication value of the face is equal to or less than the allowable authentication value acquired from the authentication biometric information database 171 (Step S106). When the determined authentication value of the face is equal to or less than the allowable authentication value (Step S106: YES), whether the user using the authentication apparatus 1 is the user himself or herself is gray, and therefore the authentication determiner 182 executes supplementary authentication being authentication by behavior information. First, the authentication determiner 182 causes the authentication information acquirer 181 to acquire a currently connected communication connection destination from the communicator 10. The authentication determiner 182 receives the acquired current communication connection destination of the communicator 10 from the authentication information acquirer 181.

Next, the authentication determiner 182 acquires the authentication behavior information database 172 from the authentication apparatus storage 17 illustrated in FIG. 3. The authentication determiner 182 acquires acquired information, a count, and an acceptance condition associated with "communication connection" out of behavior types stored in the table in the authentication behavior information database 172 illustrated in FIG. 6B. For example, SSIDs ABC_WLAN and 123WLAN are stored in the acquired information for "communication connection" as illustrated in FIG. 6B. For this ABC_WLAN, 31 as a connection count and a connection count equal to or greater than 100 as an acceptance condition are stored. Further, for 123WLAN, 157 as a connection count and a connection count equal to or greater than 100 as an acceptance condition are stored. A case of satisfying an acceptance condition is hereinafter referred to as a reliable case, and a case of not satisfying an acceptance condition is referred to as an unreliable case.

By comparing the current communication connection destination of the communicator 10 received from the authentication information acquirer 181 with the acquired information acquired from the authentication behavior information database 172, the authentication determiner 182 determines whether the current communication connection destination is an unreliable connection destination (Step S107). For example, it is assumed here that the SSID ABC_WLAN is acquired as the current communication connection destination of the communicator 10. For ABC_WLAN in the acquired information for the behavior type "communication connection" stored in the authentication behavior information database 172, the connection count is 31, and the acceptance condition is a connection count equal to or greater than 100. Accordingly, the current communication connection destination is an unreliable communication connection destination (Step S107: YES), and therefore whether a reliable event is executed is determined (Step S108).

The authentication determiner 182 causes the authentication information acquirer 181 to acquire a content of an event executed immediately before from the operation input device 14. From a calendar included in the authentication apparatus 1, the authentication determiner 182 acquires whether a scheduled event exists at the current date and time and information about a location where the scheduled event takes place. When a scheduled event does not exist on the day, the authentication determiner 182 determines nonexistence of execution of a reliable event (Step S108: YES) and calculates the distance between the face and the authentication apparatus 1 (Step S109). Further, when a scheduled event exists on the day, the authentication determiner 182 causes the authentication information acquirer 181 to acquire the current positional information from the position detector 16. Next, the authentication determiner 182 acquires the authentication behavior information database 172 from the authentication apparatus storage 17 illustrated in FIG. 3.

The authentication determiner 182 acquires acquired information and an acceptance condition associated with "event execution" out of the behavior types stored in the table in the authentication behavior information database 172 illustrated in FIG. 6B. For example, it is assumed that "○×Park" and "△● Movie Theater" are stored as locations where events take place in the acquired information for "event execution" and that "a distance within 100 m" is stored as an acceptance condition for both locations, as described in FIG. 6B.

For example, it is assumed here that "○×Park" is stored as a location of an event taking place at the current date and time on the calendar included in the authentication apparatus 1. The authentication determiner 182 compares the current positional information caused to be acquired from the position detector 16 by the authentication information acquirer 181 with positional information of "○×Park" being the location of the event taking place at the current date and time. For example, it is assumed that the distance between the current positional information and the positional information of "○×Park" being the location of the event is 113 m. In this case, execution of a reliable event is determined to be nonexistent (Step S108: YES), and the distance between the face and the authentication apparatus 1 is calculated (Step S109). The distance between the face of the user and the authentication apparatus 1 is calculated based on the proportion of the face of the user in the facial photograph of the user facing the front of the authentication apparatus 1, the photograph being taken by the front-facing camera 11A illustrated in FIG. 2.

Next, the authentication determiner 182 acquires the authentication behavior information database 172 from the authentication apparatus storage 17 illustrated in FIG. 3. The authentication determiner 182 acquires a mean distance and an acceptance condition associated with "the distance between the face and the terminal device" out of the behavior types stored in the table in the authentication behavior information database 172 illustrated in FIG. 6B. For example, 262 mm is stored as a mean distance and within plus or minus 20 mm of the mean distance as an acceptance condition for "the distance between the face and the terminal device," as illustrated in FIG. 6B.

The authentication determiner 182 determines whether the distance between the face of the user and the authentication apparatus 1 calculated in Step S109 is within a setting range set in the acceptance condition acquired from the authentication behavior information database 172 (Step S110). Specifically, the mean distance acquired from the authentication behavior information database 172 is 262 mm, and the acceptance condition is within plus or minus 20 mm of the mean distance; and therefore whether the distance falls within a range from 242 mm to 282 mm is determined.

When the distance between the face of the user and the authentication apparatus 1 calculated in Step S109 falls within the range from 242 mm to 282 mm (Step S110: YES), the authentication determiner 182 authenticates the user using the authentication apparatus 1 to be the user himself or herself. The authentication determiner 182 causes the authentication information updater 184 to update various types of data stored in the authentication biometric information database 171 and the authentication behavior information database 172 illustrated in FIG. 2 (Step S111).

Specifically, the authentication information updater 184 updates registered information associated with the biometric information type "face" in the table in the authentication biometric information database 171 illustrated in FIG. 6A by adding a feature value of the facial image received from the authentication information acquirer 181 by the authentication determiner 182 to a feature value of the facial image stored in the registered information. Next, the authentication information updater 184 updates a count stored in the latest status associated with the behavior type "communication connection" in the table in the authentication behavior information database 172 illustrated in FIG. 6B by adding 1. Further, the authentication information updater 184 updates the latest status associated with the behavior type "the distance between the face and the terminal device" stored in the table in the authentication behavior information database 172 illustrated in FIG. 6B with a mean distance determined from the stored mean distance and "the distance between the face and the terminal device" calculated in Step S109.

Thus, precision of biometric information and behavior information of a user is improved by updating biometric information stored in the authentication biometric information database 171 and behavior information stored in the authentication behavior information database 172. Therefore, precision of user authentication can be improved.

Further, when the authentication value of the face determined by the authentication determiner 182 is not equal to or greater than the authentication threshold value of the authentication value (Step S105: NO), the authentication determiner 182 causes the authentication information acquirer 181 to acquire a currently connected communication connection destination from the communicator 10. The authentication determiner 182 receives the acquired current communication connection destination of the communicator 10 from the authentication information acquirer 181. Next, the authentication determiner 182 acquires the authentication behavior information database 172 from the authentication apparatus storage 17 illustrated in FIG. 2. The authentication determiner 182 acquires acquired information, a count, and an acceptance condition associated with "communication connection" out of the behavior types stored in the table in the authentication behavior information database 172 illustrated in FIG. 6B. The authentication determiner 182 determines whether the current communication connection destination is a reliable connection destination by comparing the current communication connection destination of the communicator 10 received from the authentication information acquirer 181 with the acquired information acquired from the authentication behavior information database 172 (Step S112).

For example, it is assumed here that the SSID 123WLAN is acquired as the current communication connection destination of the communicator 10. For 123WLAN in the acquired information for the behavior type "communication connection" stored in the authentication behavior information database 172A, the connection count is 156, and the acceptance condition is a connection count equal to or greater than 100. Accordingly, the current communication connection destination is a reliable communication connection destination (Step S112: YES), and therefore the authentication determiner 182 authenticates the user using the authentication apparatus 1 to be the user himself or herself. Subsequently, the authentication determiner 182 causes the authentication interval to be longer than the current authentication interval (Step S113). The reason is that when the current communication connection destination is a reliable communication connection destination, the user himself or herself is considered to be in a reliable environment such as a home or a workplace. In this case, the authentication frequency may be decreased and authentications may be performed a minimally required number of times by causing the authentication interval to be longer than the current authentication interval.

For example, it is assumed here that the SSID ABC_WLAN is acquired as the current communication connection destination of the communicator 10. For ABC_WLAN in the acquired information for the behavior type "communication connection" stored in the authentication behavior information database 172A, the connection count is 31, and the acceptance condition is a connection count equal to or greater than 100. Accordingly, the current communication connection destination is not a reliable communication connection destination (Step S112: NO), and therefore the authentication determiner 182 does not authenticate the user using the authentication apparatus 1 to be the user himself or herself and does not cause the authentication interval to be longer than the current authentication interval.

For example, it is assumed in Step S107 that the SSID 123WLAN is acquired as the current communication connection destination of the communicator 10. For 123WLAN in the acquired information for the behavior type "communication connection" stored in the authentication behavior information database 172, the connection count is 156, and the acceptance condition is a connection count equal to or greater than 100. Accordingly, the current communication connection destination is a reliable communication connection destination (Step S107: NO), and therefore the authentication determiner 182 authenticates the user using the authentication apparatus 1 to be the user himself or herself.

Further, for example, it is assumed in Step S108 that "Δ● Movie Theater" is stored as a location of an event taking place at the current date and time on the calendar included in the authentication apparatus 1. The authentication determiner 182 compares the current positional information caused to be acquired from the position detector 16 by the authentication information acquirer 181 with positional information of "Δ● Movie Theater" being the location of the event taking place at the current date and time. For example, it is assumed that the distance between the current positional information and the positional information of "Δ● Movie Theater" being the location of the event is 72 m. In this case, the authentication determiner 182 determines execution of a reliable event to be not nonexistent (Step S108: NO) and authenticates the user using the authentication apparatus 1 to be the user himself or herself.

The authentication determiner 182 causes the authentication interval to be longer than the current authentication interval (Step S113). The authentication determiner 182 calculates the distance between the face of the user and the authentication apparatus 1 (Step S114). Next, the authentication determiner 182 acquires the authentication behavior information database 172 from the authentication apparatus storage 17 illustrated in FIG. 3. The authentication determiner 182 determines whether the distance between the face of the user and the authentication apparatus 1 calculated in Step S114 falls within a setting range set in an acceptance condition acquired from the authentication behavior information database 172 (Step S115). When the distance between the face of the user and the authentication apparatus 1 calculated in Step S109 falls within the setting range (Step S115: YES), the authentication determiner 182 authenticates the user using the authentication apparatus 1 to be the user himself or herself. The authentication determiner 182 causes the authentication information updater 184 to update various types of data stored in the authentication biometric information database 171 and the authentication behavior information database 172 illustrated in FIG. 3 (Step S111).

Specifically, the authentication information updater 184 updates registered information associated with the biometric information type "face" in the table in the authentication biometric information database 171 illustrated in FIG. 6A by adding a feature value of the facial image received from the authentication information acquirer 181 by the authentication determiner 182 in Step S105 to a feature value of the facial image stored in the registered information.

Next, the authentication information updater 184 updates a count stored in the latest status associated with the behavior type "communication connection" in the table in the authentication behavior information database 172 illustrated in FIG. 6B by adding 1. Next, the authentication information updater 184 updates the latest status associated with the behavior type "event execution" in the table in the authentication behavior information database 172 by writing the distance between the location of the event determined in Step S108: NO and the authentication apparatus 1 into the latest status. Further, the authentication information updater 184 updates the latest status associated with the behavior type "the distance between the face and the terminal device" stored in the table in the authentication behavior information database 172 illustrated in FIG. 6B with a mean distance determined from the mean distance stored in the latest status and "the distance between the face and the terminal device" calculated in Step S114.

When the distance between the face of the user and the authentication apparatus 1 calculated in Step S114 does not fall within the setting range (Step S115: NO), the authentication determiner 182 does not cause the authentication information updater 184 to update various types of data stored in the authentication biometric information database 171 and the authentication behavior information database 172 illustrated in FIG. 3.

Further, when the authentication value of the face determined by the authentication determiner 182 is not equal to or less than the allowable authentication value of the authentication value (Step S106: NO) or the distance between the face and the terminal device does not fall within the setting range in Step S110 (Step S110: NO), the authentication determiner 182 determines the user using the authentication apparatus 1 not to be the user himself or herself. The authentication determiner 182 causes the display processor 183 illustrated in FIG. 5 to display that the authentication is unsuccessful on the display 19. Next, the authentication determiner 182 calls existing biometric authentication means included in the authentication apparatus 1. It is assumed here that fingerprint authentication is called as the existing biometric authentication means. The authentication determiner 182 executes the fingerprint authentication (Step S116).

When the fingerprint authentication is successful (Step S117: YES), the authentication information acquirer 181 causes the image capture device 11 to take a facial photograph of the user operating the authentication apparatus 1 in accordance with an instruction from the authentication determiner 182. The authentication information acquirer 181 acquires an image of the taken facial photograph of the user from the image capture device 11 and determines a feature value of the facial image of the user. The authentication information acquirer 181 transmits the determined feature value of the facial image of the user to the authentication determiner 182. The authentication determiner 182 transmits the received feature value of the facial image of the user to the authentication information updater 184 illustrated in FIG. 5. The authentication information updater 184 updates a feature value of the facial image stored in registered information associated with the biometric information type "face" in the table in the authentication biometric information database 171 illustrated in FIG. 6A by adding the received feature value of the facial image of the user to the stored feature value (Step S118). The authentication determiner 182 returns to Step S101 and executes the steps in and after Step S101.

Further, when the fingerprint authentication is not successful (Step S117: NO), the authentication determiner 182 causes the display processor 183 illustrated in FIG. 5 to display that the authentication is unsuccessful on the display 19. Next, the authentication determiner 182 causes the display processor 183 illustrated in FIG. 5 to display a login screen on the display 19 (Step S119).

The processing advances to FIG. 11B. The authentication determiner 182 determines whether the biometric authentication and the supplementary authentication are successfully performed a preset number of times (Step S120). For example, the preset number of times is any number of times such as 10 consecutive times or a total of 20 times after the authentication apparatus 1 is started. When the biometric authentication and the supplementary authentication are successfully performed the preset number of times (Step S120: YES), the authentication determiner 182 determines the mean value of authentication values of the face determined by the preset number of authentications (Step S121). Specifically, the authentication determiner 182 acquires the authentication biometric information database 171 illustrated in FIG. 3 from the authentication apparatus storage 17. The authentication determiner 182 acquires the mean value of authentication values associated with "face" out of the biometric information types from the table in the authentication biometric information database 171 illustrated in FIG. 6A. The authentication determiner 182 calculates the mean value of authentication values of the face by adding the authentication value of the face determined in Step S105 and the mean value of authentication values acquired from the authentication biometric information database 171 and then dividing the sum by 2. Further, when the biometric authentication and the supplementary authentication are not successfully performed the preset number of times (Step S120: NO), the authentication determiner 182 skips the processing in Step S121 to Step S123 and advances to Step S124.

The authentication determiner 182 transmits the mean value of authentication values of the face determined in Step S121 to the authentication information updater 184. The authentication information updater 184 compares the received mean value of authentication values of the face with a preset upper limit of the authentication threshold value. When the mean value of authentication values of the face is equal to or greater than the preset upper limit of the authentication threshold value, the authentication information updater 184 updates the authentication threshold value associated with "face" out of the biometric information types in the table in the authentication biometric information database 171 illustrated in FIG. 6A by writing the upper limit of the authentication threshold value into the authentication threshold value. Further, when the mean value of authentication values of the face is equal to or less than the preset upper limit of the authentication threshold value, the authentication information updater 184 updates the authentication threshold value associated with "face" out of the biometric information types in the table in the authentication biometric information database 171 illustrated in FIG. 6A by writing the mean value of authentication values of the face determined in Step S121 into the authentication threshold value (Step S122).

Next, the authentication information updater 184 updates the allowable authentication value (Step S123). Specifically, when the mean value of authentication values of the face determined in Step S121 is equal to or greater than the preset upper limit of the authentication threshold value, the authentication information updater 184 sets a preset maximum allowable authentication value to the allowable authentication value. Further, when the mean value of authentication values of the face determined in Step S121 is equal to or less than the preset upper limit of the authentication threshold value, and a value acquired by adding the mean value of authentication values of the face determined in Step S121 and a default allowable authentication range value is equal to or less than the maximum allowable authentication value, the added value is set to the allowable authentication value.

When the value acquired by adding the mean value of authentication values of the face determined in Step S121 and the default allowable authentication range value is equal to or greater than the maximum allowable authentication value, the maximum allowable authentication value is set to the allowable authentication value. The authentication information updater 184 acquires the authentication biometric information database 171 illustrated in FIG. 3 from the authentication apparatus storage 17. The authentication information updater 184 updates the allowable authentication value associated with "face" out of the biometric information types in the table in the authentication biometric information database 171 illustrated in FIG. 6A by writing the determined allowable authentication value into the allowable authentication value associated with "face."

The authentication information acquirer 181 illustrated in FIG. 5 acquires the angle of inclination of the authentication apparatus 1 from the inclination detector 13. Next, the authentication information acquirer 181 acquires current date-and-time information from an unillustrated timer (Step S124). The authentication information acquirer 181 transmits the acquired angle of inclination of the authentication apparatus 1 and the acquired current date-and-time information to the authentication determiner 182. The authentication determiner 182 transmits the received angle of inclination of the authentication apparatus 1 and the received current date-and-time information to the authentication information updater 184. The authentication information updater 184 writes the received angle of inclination of the authentication apparatus 1 and the received current date-and-time information into the inclination information table 173 stored in the authentication apparatus storage 17 illustrated in FIG. 3 and retains the angle of inclination and the current date-and-time information (Step S125).

The authentication determiner 182 acquires a standby time stored in the table in the inclination information table 173 illustrated in FIG. 6C. The authentication determiner 182 transmits the acquired standby time to the authentication information acquirer 181. The authentication information acquirer 181 stands by to acquire data from the communicator 10, the image capture device 11, and the like during the received standby time (Step S126). When the standby time ends, the authentication information acquirer 181 acquires the angle of inclination of the authentication apparatus 1 from the inclination detector 13. Next, the authentication information acquirer 181 acquires current date-and-time information from the unillustrated timer (Step S127). The authentication information acquirer 181 transmits the acquired angle of inclination of the authentication apparatus 1 and the acquired current date-and-time information to the authentication determiner 182.

The authentication determiner 182 acquires an angle of the authentication apparatus 1 stored in the table in the inclination information table 173 illustrated in FIG. 6C. The authentication determiner 182 determines whether a change in angle exists by comparing the angle of inclination of the authentication apparatus 1 received from the authentication information acquirer 181 with the angle of the authentication apparatus 1 acquired from the inclination information table 173 (Step S128). When the change in the angle of the authentication apparatus 1 is not less than a preset angle value such as 30 degrees (Step S128: NO), the authentication determiner 182 determines that the authentication apparatus 1 has been moved and has undergone some operation by the user and returns to Step S101 described in FIG. 11A. Subsequently, the authentication determiner 182 executes the processing in and after Step S101.

Further, when the change in the angle of the authentication apparatus 1 is equal to or less than the preset angle value (Step S128: YES), the authentication determiner 182 determines that the authentication apparatus 1 has not been moved by the user. Next, the authentication determiner 182 determines whether a timing for authenticating the user has arrived (Step S129). The timing for authenticating the user refers to a timing when a preset authentication interval of time elapses. When the timing for authenticating the user has arrived (Step S129: YES), the authentication determiner 182 returns to Step S101 described in in FIG. 11A. Subsequently, the authentication determiner 182 executes the processing in and after Step S101. When the timing for authenticating the user has not arrived (Step S129: NO), the authentication determiner 182 returns to Step S125. The authentication determiner 182 executes the processing in Step S125 to Step S129.

When an authentication value determined from biometric information and the authentication threshold value take the same value in the aforementioned embodiment, whether the authentication is successful may be determined either in a case of the authentication value determined from the biometric information being equal to or less than the authentication threshold value or in a case of the authentication value determined from the biometric information being equal to or greater than the authentication threshold value. Further, when an authentication value determined from biometric information and the allowable authentication value take the same value, whether the authentication is successful may be determined either in a case of the authentication value determined from the biometric information being equal to or less than the allowable authentication value or in a case of the authentication value determined from the biometric information being equal to or greater than the allowable authentication value.

Figure 12:
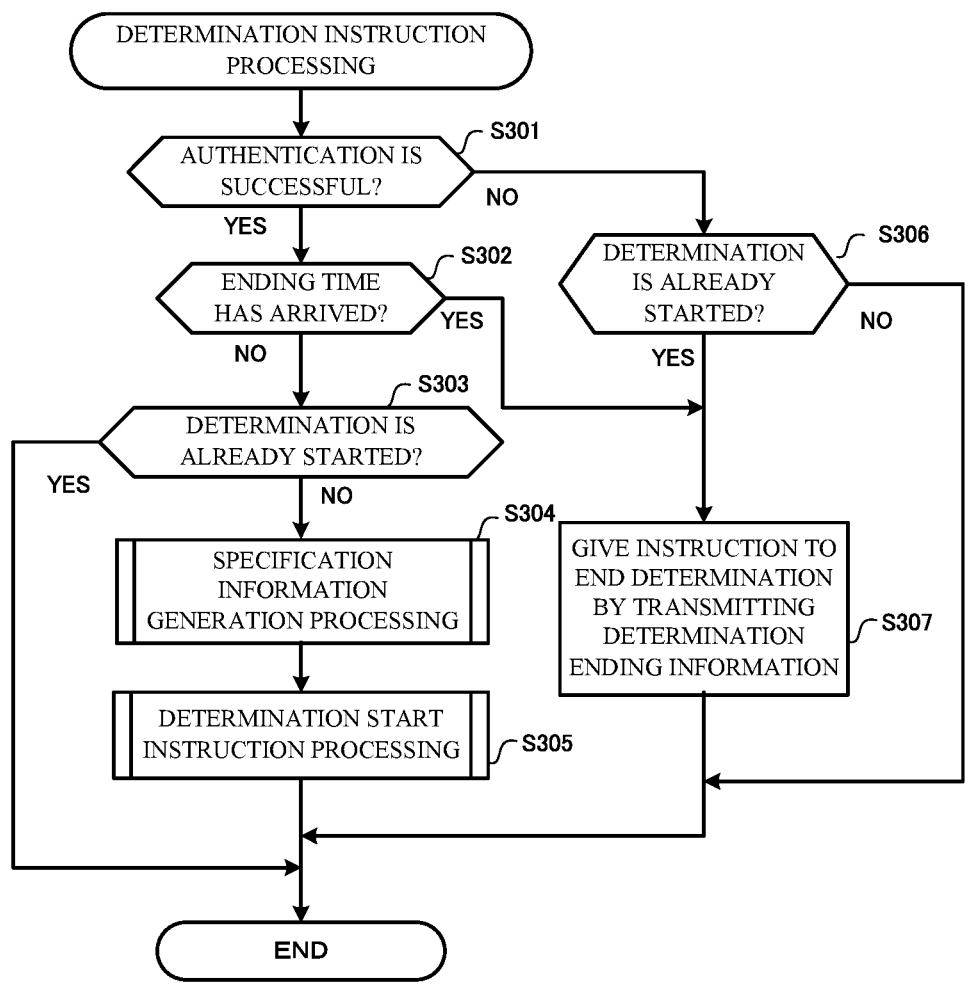
FIG. 12 is a flowchart illustrating an example of determination instruction processing.

Next, the determination instruction processing is described referring to FIG. 12. FIG. 12 is a flowchart illustrating an example of the determination instruction processing. The determination instruction processing has only to start every time the authentication processing ends; and every time the authentication processing is repeated for every set period, the determination instruction processing is also repeatedly executed. When the determination instruction processing is started, the processing device 187 determines whether authentication in the authentication processing is successful (Step S301).

When the authentication is determined to be successful (Step S301: YES), the processing device 187 determines whether an ending time of the determination target scene has arrived (Step S302). Specifically, whether an ending time of an online class has arrived is determined in processing in Step S302. Whether the ending time has arrived may be determined by determining whether a predetermined class hour of the online class has elapsed after an instruction to start determination is given by processing in Step S305 to be described later by checking a timer value.

When the ending time is not determined to have arrived (Step S302: NO), the processing device 187 determines whether the processing in Step S305 is already executed and an instruction to start determination is given, in other words, whether determination is already started (service provision is already started) (Step S303). When determination is already started (Step S303: YES), the processing device 187 directly ends the determination instruction processing. On the other hand, when determination is not already started (Step S303: NO), the processing device 187 causes the specification information generator 186 to execute the specification information generation processing of generating specification information (Step S304).

FIG. 13A is a flowchart illustrating an example of the specification information generation processing executed in Step S304 in FIG. 12. In the specification information generation processing illustrated in FIG. 13A, the specification information generator 186 first extracts a feature value of the face from the facial photograph acquired in Step S101 described in FIG. 11A (Step S201). A facial photograph of the user may be newly taken in the processing in Step S201; and in this case, whether the photograph is blurred may be determined and a retry may be performed when the photograph is blurred, similarly to the processing in Step S102 described in FIG. 11A. Further, in the processing in Step S201 described in FIG. 13, the feature value determined when YES is determined in the processing in Step S104 described in FIG. 11A may be used.

Next, the specification information generator 186 generates a biometrical key from the extracted feature value (Step S202). For example, in Step S202, a biometrical key is generated based on the feature value of the face extracted in the processing in Step S201, by using a key derivation function called a biometric-based key derivation function (BB-KDF). The key derivation function corresponds to a predetermined one-way function. While an example of generating a biometrical key, based on the feature value of the face acquired in the processing in Step S201 has been described in the processing in Step S202 in the present embodiment, for example, a feature value of a voiceprint or a fingerprint may be extracted in Step S201 and a biometrical key may be generated based on the feature value in Step S202. Further, a biometrical key may be generated based on a plurality of feature values of the face, a voiceprint, and a fingerprint. The feature value of the face extracted in Step S201 and feature values of a voiceprint and a fingerprint correspond to biometric information of the user. Further, a biometrical key corresponds to a biometric key, and the specification information generator 186 executing the processing in Step S202 and the processing in Step S202 correspond to biometric key generation means and a biometric key generation step, respectively.

For example, in the processing in Step S202, a biometrical key may be generated from the feature value extracted in Step S201 and supplementary data. While biometrical keys generated based on feature values of the same person are basically identical, there may be an event in which the keys are not identical; and data set for avoiding such an event are supplementary data. Specifically, the supplementary data are data supplementing feature values of biometric data in such a way that identical biometrical keys are generated for the same person when feature values of the biometric data have deviation. The supplementary data may be previously generated according to an amount of deviation in feature values of biometric data.

Next, the specification information generator 186 generates a random ID being randomly generated 128-bit data (Step S203). For example, a random ID may be generated by using a universal unique identifier (UUID) in the processing in Step S203. The random ID generated in the processing in Step S203 corresponds to random information.

After executing the processing in Step S203, the specification information generator 186 generates a secret key and a public key of the authentication apparatus, based on the biometrical key generated in Step S202 and the random ID generated in Step S203 (Step S204). The secret key and the public key of the authentication apparatus correspond to a second secret key and a second public key, respectively. In Step S204, the secret key and the public key of the authentication apparatus are generated in accordance with a previously stored pair key generation program, based on the biometrical key and the random ID. The random ID generated in Step S203 and the public key of the authentication apparatus generated in Step S204 are transmitted to the information processing device 7 through the communicator 10. The specification information generator 186 executing the processing in Step S204 and the processing in Step S204 correspond to second pair key generation means and a second pair key generation step, respectively.

On the information processing device 7 side, when receiving the random ID and the public key of the authentication apparatus from the authentication apparatus 1, the random ID and the public key of the authentication apparatus are registered by storing the two into the information processing device storage 77 (Step S205).

After executing the processing in Step S205, the processing device 787 in the information processing device 7 generates a secret key and a public key of the information processing device (Step S206). The secret key and the public key of the information processing device correspond to a first secret key and a second public key, respectively. In Step S206, the secret key and the public key of the information processing device are generated in accordance with a previously stored pair key generation program. The processing device 787 executing the processing in Step S206 and the processing in Step S206 correspond to first pair key generation means and a first pair key generation step, respectively. The public key of the information processing device generated in Step S206 is transmitted to the authentication apparatus 1 through the communicator 70. Therefore, the communicator 10 and the data transmitter-receiver 185 in the authentication apparatus receiving the public key of the information processing device and processing of receiving the public key of the information processing device correspond to acquisition means and an acquisition step, respectively. Then, a common key SK is generated by the authentication apparatus 1 and the information processing device 7 by the Diffie-Helman key exchange method. The common key SK corresponds to a common key.

Specifically, on the authentication apparatus 1 side, the specification information generator 186 generates a primitive common key, based on the secret key of the authentication apparatus and the received public key of the information processing device (Step S207). On the other hand, on the information processing device 7 side, the processing device 787 generates a primitive common key, based on the secret key of the information processing device and the received public key of the authentication apparatus (Step S207A). The primitive common keys are identical keys, according to the Diffie-Helman key exchange method.

Next, on the authentication apparatus 1 side, the specification information generator 186 generates the common key SK by applying the key derivation function (KDF) to the primitive common key (Step S208); and on the information processing device 7 side, the processing device 787 similarly generates the common key SK by applying the KDF to the primitive common key (Step S208A). Thus, the common key SK being common between the authentication apparatus 1 and the information processing device 7 is generated. The specification information generator 186 executing the processing in Step S208 and the processing in Step S208 correspond to first common key generation means and a first common key generation step, respectively. Further, the processing device 787 executing the processing in Step 208A corresponds to second common key generation means.

Next, on the authentication apparatus 1 side, after executing the processing in Step S208, the specification information generator 186 calculates a message authentication code (MAC) value, based on the common key SK generated in the processing in Step S208 and the random ID generated in the processing in Step S203 (Step S209). In Step S209, a MAC value based on the common key SK and the random ID is calculated by a MAC algorithm.

After executing the processing in Step S209, the specification information generator 186 generates specification information, based on the calculated MAC value and the random ID (Step S210). Specifically, in Step S210, 320-bit data including a footer are generated by adding the calculated MAC value to the random ID, and the generated data are set as specification information. The specification information generated in Step S210 is transmitted to the information processing device 7 through the communicator 10. The specification information generator 186 executing the processing in Step S210 and the processing in Step S210 correspond to specification information generation means and a specification information generation step, respectively. Further, the specification information generated in Step S210 corresponds to first specification information. The specification information may be encrypted by a preset encryption method and then be transmitted to the information processing device 7.

On the information processing device 7 side, when receiving the specification information, the processing device 787 extracts a random ID from the received specification information (Step S212). Next, the processing device 787 calculates a MAC value, based on the common key SK generated in Step S208A and the random ID extracted in Step S212 (Step S213).

After executing the processing in Step S213, the processing device 787 verifies the random ID extracted in Step S212 and the MAC value calculated in Step S213 (Step S214). Specifically, in Step S214, verification is performed by checking whether the random ID extracted in Step S212 matches the random ID registered in Step S205 and whether the MAC value calculated in Step S213 matches the MAC value included in the specification information received in Step S212. The verification result in the processing in Step S214 is transmitted to the authentication apparatus 1 through the communicator 70. The processing device 787 executing the processing in Step S214 corresponds to verification means.

On the authentication apparatus 1 side, the specification information generator 186 determines whether the received verification result is normal (Step S215) and when the verification result is normal (Step S215: YES), directly ends the specification information generation processing. On the other hand, when the verification result is not normal (Step S215: NO), the specification information generator 186 displays an error (Step S216) and then ends the specification information generation processing. In Step S216, display for prompting re-execution may be performed, or the specification information generation processing may be manually caused to be executable again.

On the other hand, the processing device 787 on the information processing device 7 side also determines whether the verification result in Step S214 is normal (Step S217). When the verification result is not normal (Step S217: NO), the processing device 787 directly ends the specification information generation processing. In this case, unsuccessful registration of specification information may be notified to the authentication apparatus 1 through the communicator 70; and, on the authentication apparatus 1 side, an error may be displayed and then the specification information generation processing may be manually caused to be executable again.

Further, when the verification result in Step S214 is normal (Step S217: YES), the processing device 787 registers the received specification information by storing the specification information into the information processing device storage 77 (Step S218) and ends the specification information generation processing. In Step S218, the processing device 787 associates the received specification information with a target user along with a determination target scene of the target user and a list of reference information and then stores the information into the information processing device storage 77 as the reference information list 771 illustrated in FIG. 10A. In other words, the processing in Step S218 may be considered as processing of generating and registering the reference information list 771 illustrated in FIG. 10A. Accordingly, the processing device 787 executing the processing in Step S218 corresponds to registration means.

Thus, by execution of the specification information generation processing illustrated in FIG. 13A, specification information for specifying a target user for whom a service is provided, that is, specification information for specifying a user being a determination target of necessity for an action according to the present embodiment is generated. Further, by execution of the specification information generation processing, specification information is registered on the information processing device 7 side, in other words, the reference information list 771 illustrated in FIG. 10A is registered on the information processing device 7 side, and therefore user specification is thereafter enabled by specification information. Further, specification information is information generated based on biometric information of a user but is not the biometric information itself, and it is impossible to generate the biometric information from the specification information. Therefore, improper acquisition of biometric information itself can be prevented, and security can be ensured. An example of executing the specification information generation processing illustrated in FIG. 13A in the determination instruction processing illustrated in FIG. 12 is described in the present embodiment, and the determination instruction processing is started every time the authentication processing is ended, and therefore the specification information generation processing is also repeatedly executed; however, the specification information generation processing may be executed once for each provided service (or for each information processing device 7) for a target user. Further, since a random ID is randomly generated, a plurality of pieces of specification information can be generated from the same biometric information (the same feature value of a face), and therefore a user workload can be lightened with ensured security, and, by extension, the user can stably receive a service.

Returning to FIG. 12, after executing the processing in Step S304, the processing device 187 executes the determination start instruction processing of giving an instruction to start processing of determining necessity for an action, as processing of giving an instruction to start a service (Step S305) and ends the determination instruction processing. By the instruction to start determination in the processing in Step S305, an online class is started, and a service for determining necessity for an action is started, on the information processing device 7 side. Challenge-response authentication is performed in the determination start instruction processing, and when the authentication is normally performed, the determination processing including an online class and the service for determining necessity for an action is executed. Therefore, the processing device 187 executing the determination start instruction processing corresponds to service provision instruction means.

Figure 13B:
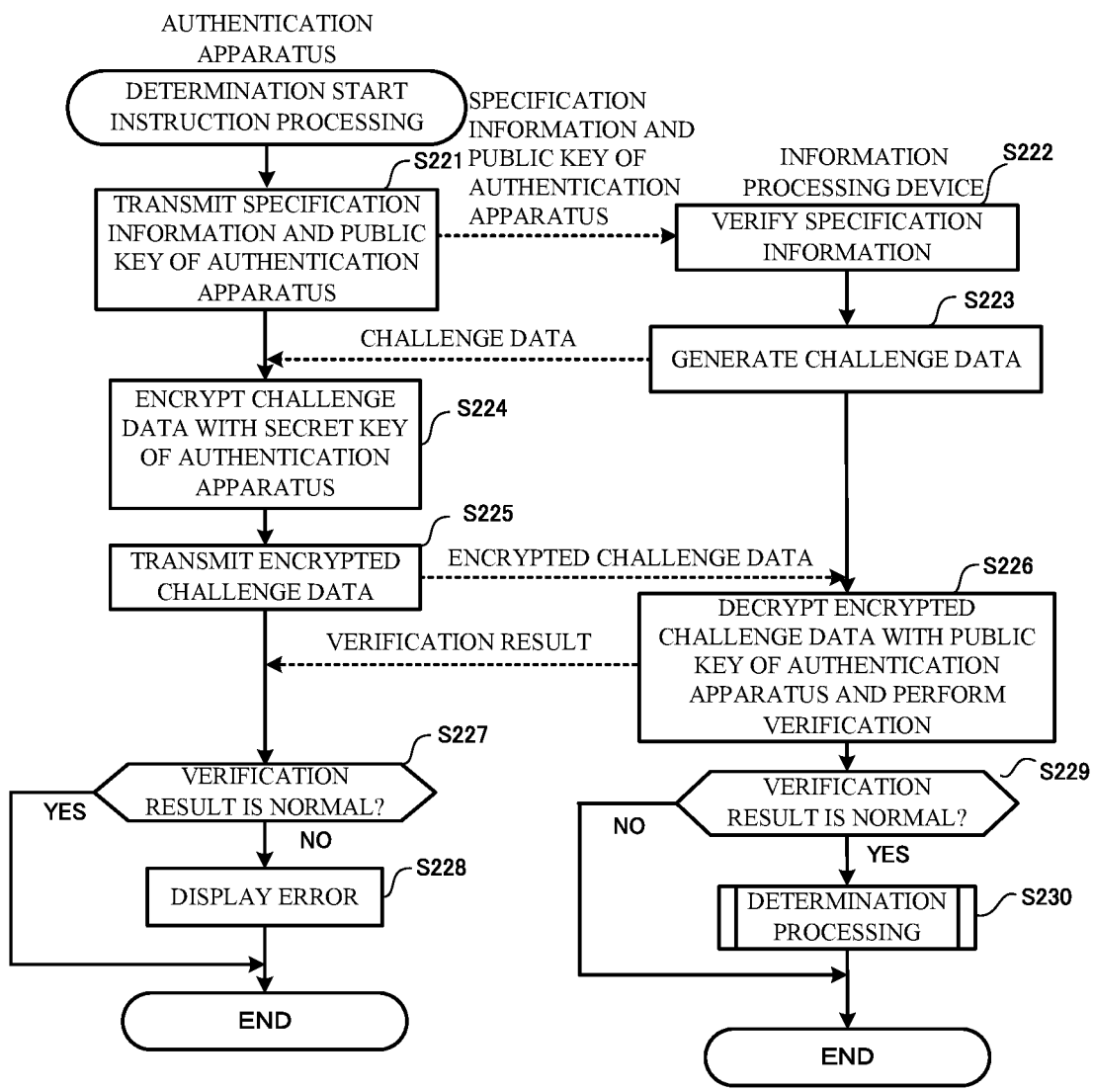
FIG. 13B is a flowchart illustrating an example of determination start instruction processing.

FIG. 13B is a flowchart illustrating an example of the determination start instruction processing executed in Step S305 in FIG. 12. In the determination start instruction processing illustrated in FIG. 13B, the processing device 187 in the authentication apparatus 1 transmits specification information and the public key of the authentication apparatus to the information processing device 7 through the communicator 10 (Step S221).

On the information processing device 7 side, the processing device 787 verifies the received specification information (Step S222). For example, in Step S222, the processing device 787 verifies the specification information by determining whether the received specification information is registered. When the verification is not normal in the processing in Step S222, the processing may be ended. After executing the processing in Step S222, in other words, when the verification result is normal, the processing device 787 generates challenge data (Step S223). The generated challenge data are transmitted to the authentication apparatus 1 through the communicator 70. Thus, the specification information is transmitted to the information processing device 7 in the processing in Step S221; and when verification of the specification information is normal, the challenge-response authentication is performed. Therefore, the processing in Step S221 corresponds to an authentication instruction step of giving an instruction to perform authentication for providing a service related to the user specified by the specification information.

On the authentication apparatus 1 side, the processing device 187 encrypts the received challenge data with the secret key of the authentication apparatus (Step S224) and transmits the encrypted challenge data to the information processing device 7 through the communicator 10 (Step S225).

Next, on the information processing device 7 side, the processing device 787 decrypts the encrypted challenge data with the public key of the authentication apparatus and performs verification (Step S226). Specifically, in Step S226, the processing device 787 performs verification by checking whether the decrypted challenge data match the challenge data generated in Step S223. The verification result is transmitted to the authentication apparatus 1 through the communicator 70.

On the authentication apparatus 1 side, the processing device 187 determines whether the received verification result is normal (Step S227) and when the verification result is normal (Step S227: YES), directly ends the determination start instruction processing. On the other hand, when the verification result is not normal (Step S227: NO), the processing device 187 displays an error (Step S228) and then ends the determination start instruction processing. In Step S228, display for prompting re-execution may be performed, or the determination start instruction processing may be manually caused to be executable again.

On the other hand, the processing device 787 on the information processing device 7 side also determines whether the verification result in Step S226 is normal (Step S229). When the verification result is not normal (Step S229: NO), the processing device 787 directly ends the determination start instruction processing. In this case, an unsuccessful start of the service, that is, an unsuccessful start of determination may be notified to the authentication apparatus 1 through the communicator 70; and, on the authentication apparatus 1 side, an error may be displayed, and the determination start instruction processing may be manually caused to be executable.

Further, when the verification result in Step S229 is normal (Step S229: YES), the processing device 787 executes the determination processing including an online class and the service for determining necessity for an action (Step S230) and ends the determination start instruction processing. By execution of the processing in Step S230, the service is provided for a service provision target user. Therefore, the processing device 787 executing the processing in Step S230 corresponds to service providing means. As described later, the determination processing is executed by the determiner 782. Therefore, the processing device 787 and the determiner 782 may be considered to constitute the service providing means by cooperation.

Thus, by execution of the determination start instruction processing illustrated in FIG. 13B, verification of specification information is performed and service provision is started. As described above, specification information is information generated based on biometric information of a user but is not the biometric information itself; and it is impossible to generate the biometric information from the specification information. Therefore, improper acquisition of biometric information itself can be prevented and security can be ensured. An example of executing the determination start instruction processing illustrated in FIG. 13B in the determination instruction processing illustrated in FIG. 12 is described in the present embodiment, and the determination instruction processing is started every time the authentication processing is ended, and therefore the determination start instruction processing is also repeatedly executed; however, once the determination processing is executed (once the service is started), YES is determined in Step S303 described in FIG. 12, and the determination start instruction processing is not executed again.

Returning to FIG. 12, when determining that the authentication is unsuccessful in Step S301 (Step S301: NO), the processing device 187 determines whether the processing in Step S305 is already executed and an instruction to start determination is given, that is, whether determination is already started (service provision is already started), similarly to Step S303 (Step S306). When determination is not already started (Step S306: NO), the processing device 187 directly ends the determination instruction processing. On the other hand, when determination is already started (Step S306: YES) or when the ending time of the determination target scene is determined to have arrived in Step S302 (Step S302: YES), the processing device 187 gives an instruction to end the determination by transmitting determination ending information for ending determination of necessity for an action to the information processing device 7 (Step S307) and ends the determination instruction processing.

On the information processing device 7 side, the online class may be ended by the instruction to end determination being given in the processing in Step S307. Specifically, YES in determination in Step S306 indicates that authentication is unsuccessful due to substitution with another person or the like in spite of determination of necessity for an action being already started (the online class being already started). In this case, substitute attendance can be prevented by giving an instruction to end the determination in the processing in Step S307 and forcibly ending the online class. Further, when the ending time has arrived (YES is determined in Step S302), the online class is also ended, and therefore an erroneous determination that an action is determined to be necessary in spite of the online class being ended can be prevented by synchronization between the authentication apparatus 1 and the information processing device 7.

Next, the determination processing performed in the information processing device 7 is described referring to FIG. 14. FIG. 14 is a flowchart illustrating an example of the determination processing executed in Step S230 in FIG. 13B. When starting the determination processing illustrated in FIG. 14, the determiner 782 specifies a user related to the acquired specification information from the reference information list 771 stored in the information processing device storage 77 (Step S401). Specifically, in Step S401, when the acquired user specification information is "XXXXXXXX," the determiner 782 refers to the reference information list 771 illustrated in FIG. 10A and specifies the target user to be the user A. Next, based on a selection operation on the operation input device 73, the determiner 782 specifies a scene selected by the user and reference information (Step S401A). Specifically, in Step S401A, based on the selection operation on the operation input device 73 by the user, the determiner 782 refers to the reference information list 771 and specifies a scene and reference information. For example, when Online Class 1 is selected, the determiner 782 specifies a determination threshold value to be "3.00," an allowable determination value to be "3.50," and an allowable count to be "5."

After executing the processing in Step S401 and Step S401A, the processing device 787 executes the scene specified in Step S401 and Step S401A by executing a program for implementing the specified scene (Step S402). Specifically, in the processing in Step S402, the processing device 787 starts an online class (a 60-minute mathematics class) corresponding to Online Class 1. Next, the determiner 782 determines whether determination ending information is received by the determination information acquirer 781 from the authentication apparatus 1 through the communicator (Step S403).

When determination ending information is received (Step S403: YES), the determiner 782 and the processing device 784 ends the scene by ending the program executed in Step S402 (Step S404) and ends the determination processing. Specifically, in processing in Step S404, the determiner 782 and the processing device 784 end the online class (60-minute mathematics class) corresponding to Online Class 1 executed in Step S402 and end the determination processing. As described above, determination ending information is transmitted when the ending time of the online class arrives and is also transmitted when authentication is unsuccessful due to substitution with another person or the like in spite of determination of necessity for an action being already started (the online class being already started). Therefore, the processing in Step S404 ends the online class in a case of substitution with another person and therefore can prevent substitute attendance.

On the other hand, when determination ending information is determined to be not received in Step S403 (Step S403: NO), the determination information acquirer 781 acquires an image of the user from the image capture device 71 as determination target information (Step S405), and the determiner 782 calculates a determination value, based on the acquired image (Step S406). In the processing in Step S406, a comprehensive score related to a plurality of elements such as the height of a line of sight of the user, a movement of the head, and a movement of a hand may be calculated as a determination value by a predetermined computing equation, based on the acquired image, as described above.

After executing the processing in Step S406, the determiner 782 determines whether the determination value calculated in Step S406 is less than the determination threshold value specified in Step S402 (Step S407). Specifically, in Step S407, the determiner 782 determines whether the determination value calculated in Step S406 is less than the determination threshold value "3.00" specified in Step S402. When the determination value is less than the determination threshold value (Step S407: YES), the determiner 782 determines that necessity for an action does not exist and, by the function of the determination information updater 784, updates the determination threshold value and the like by performing learning using the determination value along with the result that necessity for an action does not exist as input data (Step S413) and then returns to the processing in Step S403.

On the other hand, when the determination value is equal to or greater than the determination threshold value (Step S407: NO), the determiner 782 determines whether the determination value calculated in Step S406 is equal to or less than the allowable determination value specified in Step S402 (Step S408). Specifically, in Step S408, the determiner 782 determines whether the determination value calculated in Step S406 is equal to or less than the allowable determination value "3.50" specified in Step S402.

When the determination value is equal to or less than the allowable determination value (Step S408: YES), the determiner 782 determines whether a count value indicating the number of times the determination value is counted to be equal to or less than the allowable count is equal to or less than the allowable count specified in Step S402 (Step S409). Specifically, in Step S409, the determiner 782 determines whether the count value previously provided in a predetermined area in the information processing device storage 77 is equal to or less than the allowable count "5" specified in Step S402.

When determining that the count value is equal to or less than the allowable count in Step S409 (Step S409: YES), the determiner 782 increments the value of the count value by one (Step S410). Then, by the function of the determination information updater 784, the determiner 782 updates the determination threshold value and the like by performing learning using the determination value along with the result that necessity for an action does not exist in spite of the determination as a gray zone as input data (Step S413) and then returns to the processing in Step S403. For example, the count value may be cleared to an initial value "0" by performing the processing in Step S404 or processing in Step S411 to be described later. Further, even when being incremented by one by the processing in Step S410, the count value may be decremented by one when the determination value is determined to be less than the determination threshold value by the subsequently performed processing in Step S407. Furthermore, the count value being incremented by one by the processing in Step S410 may be cleared to the initial value "0" when the determination value is subsequently determined to be less than the determination threshold value three consecutive times in Step S407. Further, a subtraction condition and a clearing condition of the count value may vary by determination target user or determination target scene.

When determining that the determination value exceeds the allowable determination value in Step S408 (Step S408: NO) or when determining that the count value exceeds the allowable count in Step S409 (Step S409: NO), the determiner 782 determines that an action is necessary. Then, in response to the determination result, the processing device 787 refers to the action information 772 stored in the information processing device storage 77 and determines a specific action (Step S411). For example, in the processing in Step S411, the processing device 787 refers to the action information 772 illustrated in FIG. 10B and, based on the image acquired in Step S405, determines a specific action to be "WAKE UP" when a period of the height of the line of sight being less than 20 cm continues for 1 minute or longer and determines a specific action to be "DON'T SLEEP" when the period of the height of the line of sight being less than 20 cm continues for 10 seconds to 1 minute. The period for determining a specific action may be calculated by totaling past images, and for example, whether the period of the height of the line of sight being less than 20 cm continues for 1 minute or longer, or the like may be determined by totaling an image acquired this time and an image acquired last time. The period of an image acquired in the processing in Step S405 has only to be settable to any period for each determination target scene and, for example, is set to 20 seconds for an online class and 30 seconds for a test. Further, as described above, a different specific action may be set to the same scene for each target user, and a specific action may vary by past action count.

After executing the processing in Step S411 described in FIG. 14, the processing device 787 outputs the specific action determined in the processing in Step S411 to the display 79 in cooperation with the display processor 783 (Step S412). In the processing in Step S412, output of a voice to the display 79 may be performed in addition to an output of a message and/or an image. Further, as described above, an output mode may vary by target user or scene in an online class, examples of which include a message and a voice being output together as a specific action for a user for whom an action has been determined to be necessary five times or greater in the past and only a message being output for other users.

After the processing in Step S412 is executed, by the function of the determination information updater 784, the determiner 782 updates the determination threshold value and the like by performing learning using the determination value along with the result that necessity for an action exists as input data (Step S413) and then returns to the processing in Step S403. In the processing in Step S413, the allowable determination value and the allowable count value may be updated in addition to the determination threshold value. Further, for example, when the determination value is equal to or less than the allowable determination value, NO is determined in the processing in Step S408, and a specific action is output in the processing in Step S412; however, the processing in Step S412 may be performed in spite of nonexistence of necessity for an action. In that case, the output may be canceled by an input operation by the user through the operation input device 73. Specifically, when the processing in Step S412 is executed in spite of a user not dozing during attendance of an online class and message output of "DON'T SLEEP" is performed, the message output may be canceled by an input operation by the user through the operation input device 73. In this case, the determiner 782 may update the determination threshold value and the like in the processing in Step S413 by performing learning using the determination value along with the result that cancellation is executed, in other words, an erroneous determination is made as input data and then may return to the processing in Step S403. Thus, the determination threshold value being a determination reference can be optimized according to a determination target and a determination scene, and determination of necessity for an action based on a determination target user and a determination target scene can be more precisely performed. The processing in Step S407 to Step S411 and Step S413 may be performed in the background of the online class; and as for the processing in Step S412, a message output may be superposed on a display screen of the online class. Further, when a voice is output, the volume of a voice being output during the online class may be controlled, and a voice related to the specific action may be preferentially output.

As described above, the authentication apparatus 1 performs user authentication in the background and when the authentication is successful, generates specification information for specifying a user and transmits the specification information to the information processing device 7. Specification information is information generated based on biometric information of a user but is not biometric information itself, and it is impossible to generate the biometric information from the specification information. Therefore improper acquisition of biometric information itself can be prevented, and security can be ensured. Since a random ID is randomly generated, a plurality of pieces of specification information can be generated from the same biometric information (the same feature value of the face); and therefore a user workload can be lightened with ensured security, and, by extension, the user can stably receive a service.

Further, when a verification result of specification information is normal, the specification information is registered on the information processing device side, and therefore once registration is completed, specification of a user can be performed with the specification information thereafter. Accordingly, a user workload can be lightened with ensured security, and, by extension, the user can stably receive a service.

MODIFIED EXAMPLES

The present disclosure is not limited to the aforementioned embodiment, and various modifications and applications can be made. For example, the information processing device 7 may not have every technical feature described in the aforementioned embodiment and may include part of the configuration described in the aforementioned embodiment in such a way as to solve at least one problem in the conventional technology. Further, at least part of the following modified examples may be combined.

While an example of determining necessity for an action on a user attending an online class has been described in the aforementioned embodiment for ease of understanding, the above is an example. In addition, for example, a plurality of scenes such as determining necessity for an action in a scene of taking a test, such as "Test 1" described in FIG. 10A, is selectable. Specifically, when the scene "Test 1" is selected in the processing in Step 401A in FIG. 14, reference information related to "Test 1" for a user specified in Step S401 is specified in the processing in Step 401A.

Then, similarly to the case of an online class, necessity for an action in the scene "Test 1" may be determined in the determination processing in the information processing device 7. In a case of a test such as "Test 1," a determination value may be calculated by a computing equation different from that for an online class. Specifically, while a determination value is calculated by weighting elements focusing on actions of a user himself or herself such as the height of a line of sight of the user, a movement of the head, and a movement of a hand in the case of an online class, an image other than a user may be taken in as an element, such as whether an item unnecessary for a test, such as a reference book, a textbook, or a cheat sheet is captured as an image, in the case of a test. Then, the computing equation has only to cause a determination value to be always greater than the allowable determination value when an item unnecessary for a test is captured as an image. As for determination of an item unnecessary for a test, for example, an item other than items predetermined to be necessary for a test, such as a pencil, an eraser, a ruler, and a pair of compasses, may be defined as an unnecessary item, and such an item may be optionally set by the system administrator.

Further, while an example of calculating a comprehensive score related to a plurality of elements such as the height of a line of sight of a user, a movement of the head, and a movement of a hand as a determination value, based on an acquired image, and determining necessity for an action in the determination processing in the information processing device 7 has been described in the aforementioned embodiment, the above is an example. Instead of using determination by comparison with a comprehensive determination value, determination in the information processing device 7 may be performed similarly to the authentication processing in the authentication apparatus 1. Specifically, whether a determination value is less than a threshold value for one element may be determined, and when the determination value is equal to or greater than the threshold value and equal to or less than an allowable value, existence of necessity for an action may be determined by whether another element (such as user-specific behavior information) meets an acceptance condition.

Figure 15:
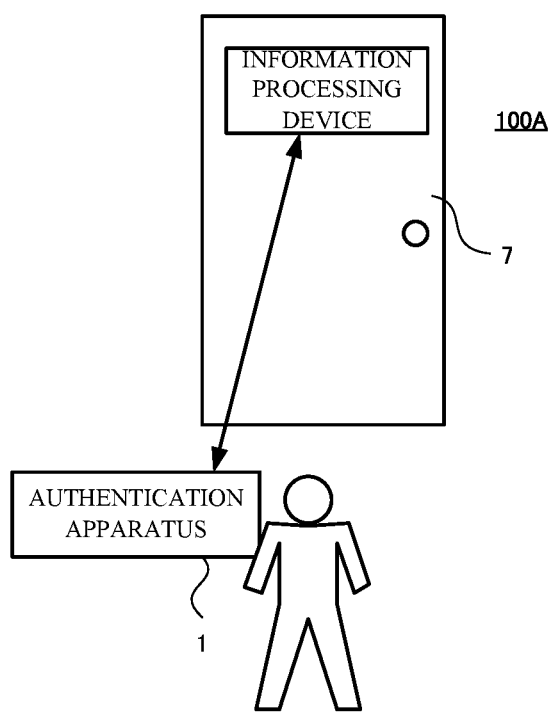
FIG. 15 is a diagram illustrating a configuration of an authentication system in a modified example.

Further, while an example of the information treatment device 7 being a personal computer, a smartphone, or a tablet terminal has been described in the aforementioned embodiment, the above is an example. Without being limited to the above, for example, the information processing device 7 may be a terminal installed on a door as is the case with an authentication system 100A illustrated in FIG. 15. In addition, for example, the information processing device 7 may be a terminal installed on a safe or a terminal installed on an automatic teller machine (ATM) installed in a financial institution or a convenience store. The information processing device 7 in this case permits entry of a user authenticated by the authentication apparatus 1 and therefore may specify the user, based on specification information and when the user is a valid user, may unlock the door or enable a financial procedure. Further, for example, the information processing device 7 may prevent entry of a person other than the user, the person not being permitted to enter, by determining necessity for an action, based on an image near the door entrance.

Specifically, while an example of the information processing device 7 according to the aforementioned embodiment starting an online class by executing a program for implementing a scene specified by Step S401 and Step S401A through the processing in Step S402 in the determination processing in FIG. 14 has been described, the information processing device 7 in the modified example may perform processing of unlocking a locked door in the processing in Step S402. Specifically, when the verification result is normal in Step S229 in FIG. 13B, the information processing device 7 may specify a target user in the determination processing illustrated in FIG. 14 and when unlocking of the door is selected as a determination target scene in Step S401A, may perform control of unlocking the door.

Further, determination of necessity for an action in the case of unlocking the door may be performed similarly to the aforementioned case of a test. For example, a determination value may be calculated by using a computing equation causing the determination value to be always greater than an allowable determination value when a person other than a successfully authenticated user is captured in an acquired image or when a successfully authenticated user exhibits an entry action different from that under normal conditions, such as an action indicating an SOS.

Further, when necessity for an action is determined to exist in the determination processing in the information processing 7 in such a case, existence of necessity for an action, that is, existence of entry by a suspicious person may be notified to a preregistered security company unlike the aforementioned embodiment. Specifically, the information processing device 7 may be connected a terminal at the security company through a network, and when determining that necessity for an action exists, the information processing device 7 may notify a specific action to the terminal at the security company through the network through the processing in Step S411 in FIG. 14. Thus, security against entry by a person other than a successfully authenticated user can be effectively provided. In the processing in Step S411 in FIG. 14, the information processing device 7 may output a warning sound in addition to notifying a specific action to the terminal at the security company through the network. Thus, occurrence of an abnormality can be informed to people around the spot by outputting a warning at the spot in addition to notification to the security company. Thus, when determining that necessity for an action exists, the information processing device 7 can notify a specific action to a destination varying by scene. Accordingly, a suitable action based on a scene can be taken.

In addition, for example, the information processing device 7 may be a terminal including various sensors and being equipped on a bed of an inpatient or a person in need of nursing care. In this case, in calculation of a determination value in the information processing device 7, not only an image of a user acquired from the image capture device 71 but also, for example, values of various sensors such as the temperature, the blood pressure, the heart rate, and the pulse of the user may be used as determination target information. Further, in determination of necessity for an action, necessity for an action may also be determined to exist in a case of a sudden change, in addition to a determination value. Specifically, necessity for an action may be determined by checking whether an amount of change in each element such as the temperature, the blood pressure, the heart rate, or the pulse is equal to or greater than a predetermined value, in addition to comparing a calculated determination value with determination reference information. Thus, even when a patient or a person in need of nursing care in the bed changes, necessity for an action can be suitably determined for a patient or a person in need of nursing care after the change.

Figure 16:
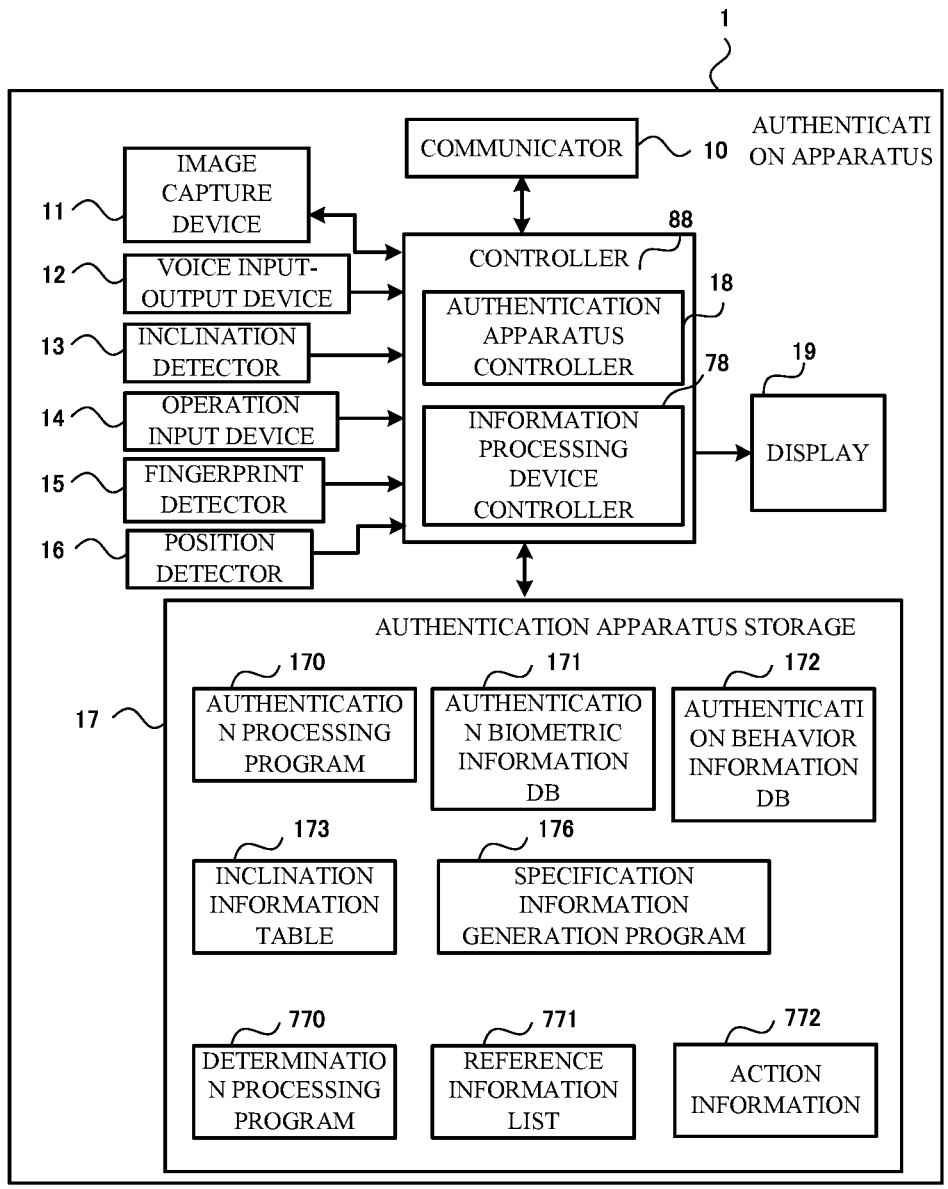
FIG. 16 is a block diagram of an authentication apparatus in a modified example.

Further, while an example of the authentication apparatus 1 and the information processing device 7 being separate terminals has been described in the aforementioned embodiment, the above is an example. The authentication apparatus 1 may be a single terminal including the function of the information processing device 7, as illustrated in FIG. 16. In this case, the authentication apparatus 1 may perform the determination processing illustrated in FIG. 14 after performing the authentication processing illustrated in FIG. 11A and FIG. 11B and the determination instruction processing illustrated in FIG. 12 (the specification information generation processing illustrated in FIG. 13A and the determination start instruction processing illustrated in FIG. 13B). Then, the authentication apparatus 1 may start an online class and determination of necessity for an action by executing the determination processing and execute the authentication processing and the determination processing in the background of the online class.

Figure 17:
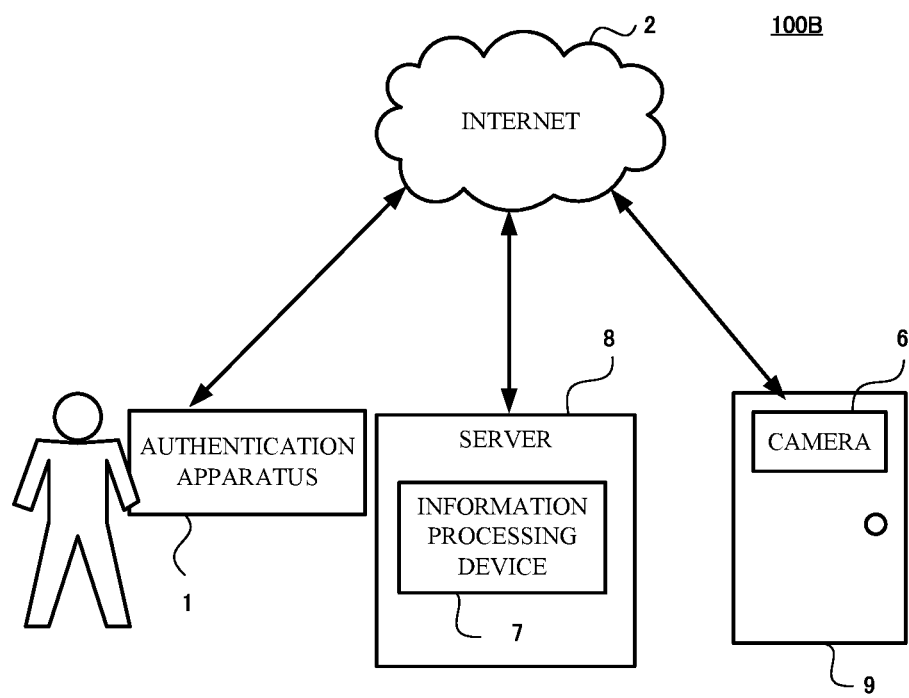
FIG. 17 is a diagram illustrating a configuration of an authentication system in a modified example.

Further, for example, the information processing device 7 may be a server 8 being communicably connected to the authentication apparatus 1 and a camera 6 provided on a door 9 through the Internet 2 as is the case in an authentication system 100B illustrated in FIG. 17. In this case, by transmission of specification information generated after authentication by the authentication apparatus 1 to the information processing device 7 as the server 8, the server 8 may start acquisition of an image by the camera 6 on the door 9. Then, the server 8 may determine necessity for an action on a target user specified based on the specification information by specifying a determination threshold value and the like based on the user and a related scene, calculating a determination value, based on the acquired image, and performing comparison. Further, while an example of communication through the Internet 2 has been described in the illustrated example, for example, the door 9 may be provided with a device performing opening-closing control of the door 9 (opening-closing device), and the opening-closing device may be communicable with the authentication apparatus 1 by short-distance wireless communication such as Bluetooth (registered trademark). Then, communication between the authentication apparatus 1 and the opening-closing device provided on the door 9 is performed by the short-distance wireless communication, and when authentication by the authentication apparatus 1 is successful and opening and closing of the door is selected as a scene, control of unlocking the door 9 may be performed. For example, when a user is specified by the specification information and a scene of opening and closing of the door is selected, an unlocking key of the door 9 may be transmitted from the information processing device 7 to the authentication apparatus 1.

Further, for example, the authentication system 100 is applicable to authentication in online shopping. In this case, in the processing in Step S218 described in FIG. 13A, specification information, and credit card information of the user and shipping address information may be registered in association with each other. Then, by transmission of specification information by the user, an online shopping service may be provided and a procedure from purchase to shipping may be performed, in the determination start instruction processing illustrated in FIG. 13B and the determination processing illustrated in FIG. 14.

In addition, the authentication system is applicable to situations in which a service is provided by individual authentication of a user, such as facilities such as a concert and an event where only a ticket holder can enter, and certificates of an academic record and vaccination. In any situation, biometric information itself is not transmitted or received, and a plurality of pieces of specification information can be generated from the same biometric information (the same feature value of the face); and therefore a user workload can be lightened with ensured security and, by extension, the user can stably receive a service.

Further, while an example of performing so-called challenge-response authentication in the determination start instruction processing as illustrated in FIG. 13B has been described in the aforementioned embodiment, the above is an example. For example, another type of processing using a time stamp such as determination start instruction processing illustrated in FIG. 18 may be performed.

FIG. 18 is a flowchart illustrating an example of determination start instruction processing in a modified example. In the diagram, the same processing as that indicated in FIG. 13B is given the same step number.

In the determination start instruction processing illustrated in FIG. 18, the processing device 187 in the authentication apparatus 1 calculates a MAC value, based on the common key SK generated in Step S208 described in FIG. 13A, the random ID generated in Step S203, and the current time stamp (Step S251). In Step S251, a MAC value may be calculated similarly to the processing in Step S209 described in FIG. 13A.

After executing the processing in Step S251, the processing device 187 generates specification information, based on the calculated MAC value, the random ID, and the time stamp used in Step S251 (Step S252). In Step S252, 320-bit data including a footer are generated by adding the calculated MAC value and the time stamp to the random ID, similarly to Step S210 described in FIG. 13A, and the generated data are set as specification information. Generation of specification information in the processing in Step S252 corresponds to generation of second specification information. For example, specification information including an authentication count, that is, the number of times the specification information is generated and transmitted may be generated.

After executing the processing in Step S252, the processing device 187 transmits the generated specification information to the information processing device 7 through the communicator 10 (Step S253). The specification information may be transmitted to the information processing device 7 after being encrypted by a preset encryption method.

When receiving the specification information on the information processing device 7 side, the processing device 787 extracts a random ID and a time stamp from the received specification information (Step S254). Next, the processing device 787 calculates a MAC value, based on the common key SK generated in Step S208A described in FIG. 13A, and the random ID and the time stamp extracted in Step S254 described in FIG. 18 (Step S255).

After executing the processing in Step S255, the processing device 787 verifies the MAC value calculated in Step S255 (Step S256). Specifically, in Step S256, the processing device 787 performs verification by checking whether the MAC value calculated in Step S255 matches the MAC value included in the specification information received in Step S254. When an authentication count is included in the specification information, whether the authentication count included in the specification information matches a stored authentication count may be further checked. The verification result in the processing in Step S256 is transmitted to the authentication apparatus 1 through the communicator 70. Processing similar to that in FIG. 13B is thereafter performed, and the determination processing is executed. Specifically, in the processing in Step S229, the user is determined to be a valid user when the verification result of the MAC value is normal; and the determination processing is executed, and a service is provided. On the other hand, when the verification result has an abnormality; the user is determined not to be a valid user; and the processing is ended without execution of the determination processing. When an authentication count is included in the specification information, for example, the authentication count may be updated when the verification result in the processing in Step S256 is normal. Specifically, an authentication count stored on the information processing device 7 side may be incremented by one when the processing in Step S230 is executed, and an authentication count stored on the authentication apparatus 1 side may be incremented by one when the verification result is determined to be normal in Step S227; and thus the authentication counts being stored in the authentication apparatus 1 and the information processing device 7, respectively, may be updated. Then, the updated authentication count may be included in the specification information the next time the service is provided, in other words, in the next determination start instruction processing.

Thus, by transmission of specification information including a time stamp, the determination processing can be executed and a service can be provided without performing so-called challenge-response authentication. Thus, a workload when a user receives the service can be lightened, and the user can stably receive a service.

Further, while an example of generating specification information by using a random ID in the specification information generation processing has been described in the aforementioned embodiment, as illustrated in FIG. 13A, the above is an example. For example, specification information may be generated without using a random ID as is the case with specification information generation processing illustrated in FIG. 19.

FIG. 19 is a flowchart illustrating an example of specification information generation processing in a modified example. In the diagram, the same processing as that indicated in FIG. 13A is given the same step number. Specifically, processing in Step S201 and Step S202 is similar to the processing in Step S201 and Step S202 described in FIG. 13A, and therefore description thereof is omitted.

In the specification information generation processing illustrated in FIG. 19, after generating a biometrical key by executing the processing in Step S202, the specification information generator 186 in the authenticator 1 calculates a hash value of the generated biometrical key and sets the calculated hash value as specification information (Step S203A). The hash value may be calculated in accordance with a previously stored hash function.

After executing the processing in Step 203A, the specification information generator 186 generates a secret key and a public key of the authentication apparatus (Step S204A). In Step S204A, a secret key and a public key of the information processing device are generated in accordance with a previously stored pair key generation program. After generating the secret key and the public key of the authentication apparatus, the specification information generator 186 transmits the specification information generated in Step S203A and the public key generated in Step S204A to the information processing device 7 through the communicator 10 (Step S205A).

When the specification information and the public key of the authentication apparatus are received from the authentication apparatus 1 on the information processing device 7 side, the specification information and the public key of the authentication apparatus are registered by being stored into the information processing device storage 77 (Step S206A). After registering the specification information and the public key of the authentication apparatus, the processing device 787 notifies registration completion to the authentication apparatus 1 (Step S207A) and ends the processing. On the other hand, the notification of the registration completion is received and the specification information generation processing is ended on the authentication apparatus 1 side.

Subsequently, challenge-response authentication may be performed by the determination start instruction processing illustrated in FIG. 13B, and when the authentication is normally performed, the determination processing including an online class and the service for determining necessity for an action may be executed. While received specification information is verified by determining whether the specification information is registered in the processing in Step S222 described in FIG. 13B, the received public key of the authentication apparatus may be further verified in this case. Specifically, whether specification information and a public key of the authentication apparatus identical to the specification information and the public key of the authentication apparatus registered in Step S206A are received may be verified.

Thus, generation of specification information without using a random ID enables ensured security with a lightened processing load and enables a lightened user workload and provision of a stable service.

Each of the authentication apparatus 1 and the information processing device 7 may be implemented by using a common computer without depending on a dedicated device. For example, each of the authentication apparatus 1 and the information processing device 7 executing the aforementioned processing may be configured by installing a program for causing a computer to implement either of the aforementioned devices onto a computer from a non-transitory recording medium storing the program. Further, a single authentication apparatus 1 or information processing device 7 may be configured by cooperative operation of a plurality of computers.

Further, for example, when the aforementioned functions are implemented by sharing between an operating system (OS) and an application or by cooperation between an OS and an application, only a part other than the OS may be stored in the medium.

Further, a program may be superposed on a carrier wave and be delivered through a communication network. For example, the program may be posted on a bulletin board system (BBS) on a communication network, and the program may be delivered through the network. Then, the aforementioned processing may be executed by starting the program and executing the program similarly to other application programs under control of the operating system.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2021-097393, filed on Jun. 10, 2021, the entire disclosure of which is incorporated by reference herein.

INDUSTRIAL APPLICABILITY

The present disclosure is applicable to an authentication system, an authentication apparatus, an authentication method, and a program that lighten a workload when a user receives a service and enable the user to stably receive the service.

REFERENCE SIGNS LIST

1 Authentication apparatus
2 Internet
6 Camera
7 Information processing device
8 Server
9 Door
70 Communicator
11, 71 Image capture device
11A Front-facing camera
11B Main camera
12, 72 Voice input-output device
12A Speaker
12B Microphone
13 Inclination detector
14, 73 Operation input device
15 Fingerprint detector
15A Left fingerprint sensor
15B Right fingerprint sensor
16 Position detector
17 AUTHENTICATION APPARATUS storage
18 AUTHENTICATION APPARATUS controller
19, 79 Display
21, 81 Processor
22, 82 Memory
23, 83 Display controller
24, 84 Display equipment
85 I/O port
26, 86 Storage equipment
27, 87 Communication equipment
28, 88 Data bus
77 Information processing device storage
78 Information processing device controller
100, 100A, 100B Authentication system
170 Authentication processing program
171 Authentication biometric information database
172 Authentication behavior information database
173 Inclination information table
174 Individual specification information data
175 Scene information table
176 Specification information generation program
181 Authentication information acquirer
182 Authenticator
183, 783 Display processor
184 Authentication information updater
185, 785 Data transmitter-receiver
186 Specification information generator
187, 787 Processing device
770 Determination processing program
771 Reference information list
772 Action information
781 Determination information acquirer
782 Determiner
784 Determination information updater

The invention claimed is:

1. An authentication system, comprising:
an authentication apparatus including a first memory and a first processor configured to authenticate whether a user is the user himself or herself in a background; and
an information processing device including a second memory and a second processor configured to generate a first pair key including a first public key and a first secret key, the information processing device being configured to provide a service,
wherein
the first processor of the authentication apparatus is further configured to:
generate a biometric key from biometric information of the user by a predetermined one-way function when authentication performed in the background is successful;
generate a second pair key including a second public key and a second secret key, based on the generated biometric key and a piece of random information that is randomly generated by the first processor of the authentication apparatus;
acquire the generated first public key and generate a common key based on the acquired first public key and the generated second secret key; and
generate specification information for specifying the user, based on the piece of random information and the generated common key, and
the second processor of the information processing device is further configured to:
acquire specification information that is the same as the specification information generated by the first processor;
specify the user using the acquired specification information; and
provide a service related to the user specified by the acquired specification information,
wherein the first processor of the authentication apparatus is further configured to:
generate the specification information for specifying the user based on the piece of random information and a first message authentication code (MAC) value, wherein the first MAC value is generated based on the common key, wherein the second processor of the information processing device is further configured to:
  extract the first MAC value from the acquired specification information;
  generate a second MAC value based on the common key;
  determine whether the second MAC value matches the extracted first MAC value; and
  in response to determining that the second MAC value matches the extracted first MAC value, specify the user using the acquired specification information.

2. The authentication system according to claim 1, wherein
the second processor of the information processing device is further configured to:
  acquire the generated second public key and generate the common key, based on the acquired second public key and the generated first secret key;
  acquire the specification information and verify validity of the acquired specification information;
  register the specification information in association with the user and a provided service, depending on a result of the verification;
  specify, based on a registered content, the user and a service related to the user by the acquired specification information; and
  provide the specified service for the specified user, and
the common key generated by the first processor and the common key generated by the second processor are the same.

3. The authentication system according to claim 1, wherein
the first processor of the authentication apparatus is configured to:
  generate (i) first specification information based on the piece of random information and the generated common key, and (ii) second specification information based on the piece of random information, the generated common key, and a time stamp, and
the second processor of the information processing device is configured to:
  acquire the first specification information and the second specification information, and
  provide, based on a verification result of the acquired second specification information, a service related to the user specified by the acquired first specification information.

4. An authentication apparatus, comprising a memory and a processor configured to:
  acquire a first public key from an information processing device that generates a first pair key including the first public key and a first secret key and provides a service;
  authenticate whether a user is the user himself or herself in a background;
  when authentication is successful, generate a biometric key from biometric information of the user by a predetermined one-way function;
  generate a second pair key including a second public key and a second secret key, based on the generated biometric key and a piece of random information that is randomly generated by the authentication apparatus;
  generate a common key, based on the acquired first public key and the generated second secret key;
  generate specification information for specifying the user, based on the piece of random information and a first message authentication code (MAC) value, wherein the first MAC value is generated based on the common key; and
  transmit the generated specification information to the information processing device and to cause the information processing device to
    extract the first MAC value from the specification information;
    generate a second MAC value based on the common key;
    determine whether the second MAC value matches the extracted first MAC value; and
    in response to determining that the second MAC value matches the extracted first MAC value, specifythe user by using the specification information and provide a service related to the user specified by the specification information.

5. An authentication method executable in an authentication apparatus, the authentication method comprising:
  acquiring a first public key from an information processing device that generates a first pair key including the first public key and a first secret key and provides a service;
  performing authentication of whether a user is the user himself or herself in a background;
  when the authentication is successful, generating a biometric key from biometric information of the user by a predetermined one-way function;
  generating a second pair key including a second public key and a second secret key, based on the generated biometric key and a piece of random information that is randomly generated by the authentication apparatus;
  generating a common key, based on the acquired first public key and the generated second secret key;
  generating specification information for specifying the user, based on the piece of random information and a first message authentication code (MAC) value, wherein the first MAC value is generated based on the common key; and
  transmitting the generated specification information to the information processing device and causing the information processing device to
    extract the first MAC value from the specification information;
    generate a second MAC value based on the common key;
    determine whether the second MAC value matches the extracted first MAC value; and
    in response to determining that the second MAC value matches the extracted first MAC value, specifythe user using the specification information and perform authentication for providing a service related to the user specified by the specification information.

6. A non-transitory computer-readable recording medium storing a program, the program causing a computer to function as:
  an acquirer to acquire a first public key from an information processing device that generates a first pair key including the first public key and a first secret key and provides a service;
  an authenticator to perform authentication of whether a user is the user himself or herself in a background;
  a biometric key generator to, when authentication by the authenticator is successful, generate a biometric key from biometric information of the user by a predetermined one-way function;
  a second pair key generator to generate a second pair key including a second public key and a second secret key, based on the biometric key generated by the biometric key generator and a piece of random information that is randomly generated by the authenticator;

a first common key generator to generate a common key, based on the first public key acquired by the acquirer and the second secret key generated by the second pair key generator;

a specification information generator to generate specification information for specifying the user, based on the piece of random information and a first message authentication code (MAC) value, wherein the first MAC value is generated based on the common key generated by the first common key generator; and a service provision instructor to transmit the specification information generated by the specification information generator to the information processing device and to cause the information processing device to extract the first MAC value from the specification information;

generate a second MAC value based on the common key;

determine whether the second MAC value matches the extracted first MAC value; and in response to determining that the second MAC value matches the extracted first MAC value, specify the user using the specification information and provide a service related to the user specified by the specification information.

* * * * *